United States Patent [19]

Sakata

[11] Patent Number: 5,111,309
[45] Date of Patent: May 5, 1992

[54] DENSITY CONTROL SYSTEM FOR A DIGITAL COPIER

[75] Inventor: Seiji Sakata, Yokohama, Japan
[73] Assignee: Ricoh Company, Ltd., Tokyo, Japan
[21] Appl. No.: 527,696
[22] Filed: May 21, 1990

Related U.S. Application Data

[63] Continuation of Ser. No. 191,327, May 9, 1988, abandoned.

[30] Foreign Application Priority Data

May 9, 1987 [JP] Japan .................. 62-113076
Mar. 23, 1988 [JP] Japan .................. 63-67294

[51] Int. Cl.$^5$ ............................. H04N 1/40
[52] U.S. Cl. ...................... 358/455; 355/214
[58] Field of Search ............ 358/443, 448, 455, 456, 358/457; 355/203, 208, 209, 214, 69; 346/160

[56] References Cited

U.S. PATENT DOCUMENTS

| | | | |
|---|---|---|---|
| 4,271,436 | 6/1981 | Kurose et al. | 358/461 X |
| 4,361,395 | 11/1982 | Washio et al. | 355/69 X |
| 4,542,985 | 9/1985 | Honma et al. | 355/214 X |
| 4,573,787 | 3/1986 | Sanbayashi et al. | 355/214 |
| 4,640,603 | 2/1987 | Honma | 355/214 |
| 4,699,502 | 10/1987 | Araki et al. | 355/214 |
| 4,709,250 | 11/1987 | Takeuchi | 355/214 X |
| 4,714,945 | 12/1987 | Fujiwara et al. | 355/214 X |
| 4,864,419 | 9/1989 | Saito et al. | 358/456 X |
| 4,866,533 | 9/1989 | Nagashima | 358/456 X |
| 4,987,484 | 1/1991 | Ikeda et al. | 358/456 X |

Primary Examiner—Fred L. Braun
Attorney, Agent, or Firm—Oblon, Spivak, McClelland, Maier & Neustadt

[57] ABSTRACT

A digital copier having a density control system. The background of the original document is digitally erased based on the density of the background. The image data is separately controlled and not effected by the background erasing process. A manual operating control is provided in conjunction with an automatic density mode in order to control the image data. The particular level of the image data can be adjusted even in the automatic density mode.

3 Claims, 44 Drawing Sheets

NO.

| 1-25% | 6-87% | 11-200% |
| 2-50% | 7-93% | 12-400% |
| 3-61% | 8-115% | |
| 4-71% | 9-122% | |
| 5-82% | 10-141% | |

| NOTCH | 1 | 2 | 3 | 4 | 5 | 6 | 7 |
|---|---|---|---|---|---|---|---|
| THRESHOLD LEVEL | 16 | 24 | 28 | 32 | 40 | 44 | 48 |

DENSITY CONTROL SYSTEM FOR A DIGITAL COPIER

This application is a continuation of application Ser. No. 191,327, filed on May 9, 1988, now abandoned.

BACKGROUND OF THE INVENTION

The present invention relates to a digital copier and, more particularly, to a density control system for a digital copier.

In a prior art analog copier, an automatic density control mechanism is so constructed as to erase the background of an original document and, therefore, the density of an image area is reduced to a level which is low enough to erase the background. Consequently, the copy density in the image area is necessarily lowered to prevent a clear-cut copy from being produced. On the other hand, a digital copier allows the background and the image area to be varied in level independently of each other. Hence, an automatic density control mechanism installed in a digital copier should preferably be capable of adjusting the level of image area independently of the level of the background even when the background is erased.

SUMMARY OF THE INVENTION

It is therefore an object of the present invention to provide a density control system for a digital copier which is capable of effecting optimum density control with ease.

It is another object of the present invention to provide a generally improved density control system.

In accordance with the present invention, in a density control system for a digital copier, copy density is allowed to be set even in an automatic density select mode.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
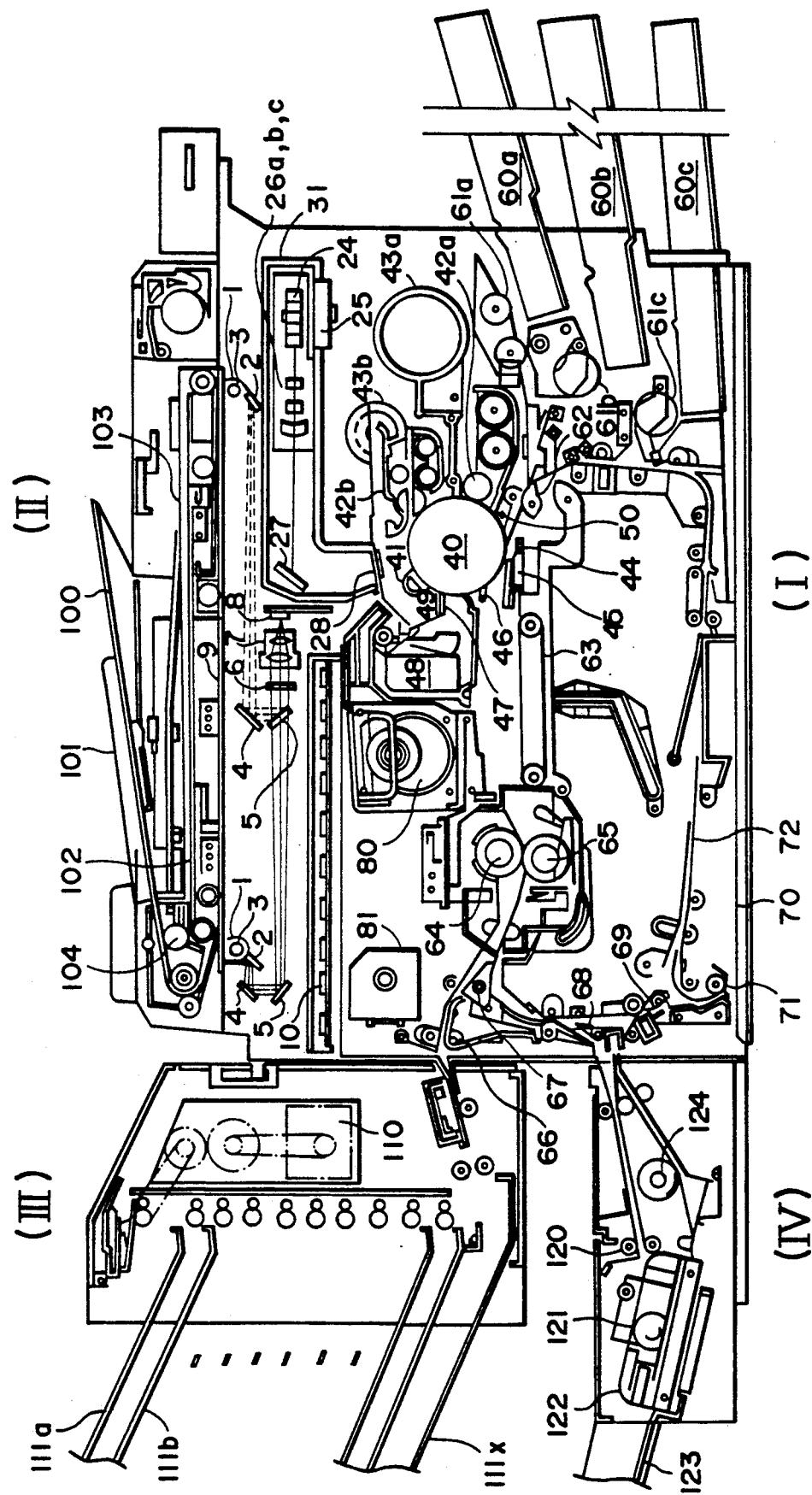
FIG. 1 is a view showing the overall construction of a digital copier in accordance with the present invention.
Figure 2:
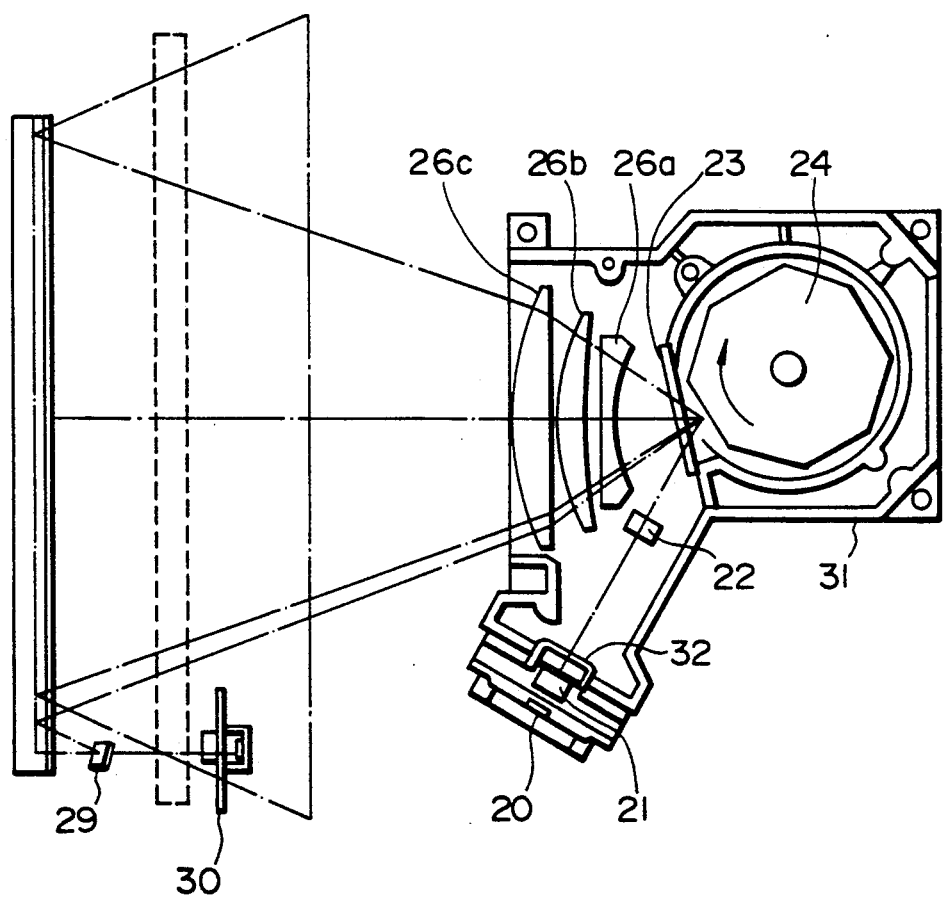
FIG. 2 is a plan view of a writing section.

Referring to FIGS. 1 and 2 of the drawings, a digital copier embodying the present invention is shown. The overall construction of the digital copier will be described first, with reference to FIG. 1. As shown in FIG. 1, the digital copier is made up of four units, i.e., a copier body (I), an ADF (II), a sorter (III), and a two-side reversal unit (IV). The copier body (I) includes a scanner section, a writing section, a photoconductive element section, a developing section, and a sheet feed section which are constructed and operated as follows.

Scanner Section

A first scanner having a mirror 1, a light source 3 and a first mirror 2 is movable at a predetermined speed. A second scanner is movable at half the speed of the first scanner and provided with a second mirror 4 and a third mirror 5. The first and second scanners optically scan an original document, not shown, which is laid on a glass platen 9. Imagewise light from the document is incident to a lens 7 via a color separating filter 6 and then focused onto a one-dimensional solid state imaging device 8.

While the light source may be implemented with a fluorescent lamp, halogen lamp or the like, use is commonly made of a fluorescent lamp which has stable wavelength and long service life. Although on light source 3 is used in the illustrative embodiment, two or more light sources 3 may be used as desired. Since imaging device 8 has a constant sampling clock, a fluorescent lamp has to be turned on at a higher frequency than the sampling clock in order to eliminate adverse influence on an image.

Usually, the imaging device 8 is implemented by a CCD. An image signal read by the imaging device 8 which is an analog signal is converted into a digital signal and then subjected to various kinds of image processing (binarization, tone processing, magnification change, edition etc. ) at an image processing board 10 to become a digital signal in the form of congregation of spots.

In this particular embodiment, the color separating filter 6 is movable into and out of an optical path which extends from the document to the imaging device 8 for the purpose of transmitting only the information associated with a necessary color. While the document is scanned, the filter 6 is moved into and out of the optical path to selectively enable a multi-transfer function, a two-side copy function and other various functions to produce a variety of kinds of copies as desired.

Writing Section

The image data undergone image processing are written on a photoconductive drum 40 in the form of congregation of light spots by raster scanning which uses a laser beam. While the laser beam may be implemented by a helium-neon (Ne-Ne) laser which has a wavelength of 633 nanometers and well matches to the sensitivity of a photoconductive element of a copier, it is very expensive and cannot be modulated without resorting to the intermediary of a complicated arrangement. In the illustrative embodiment an inexpensive and directly modulatable semiconductor laser is used taking account of the recent improvement in the sensitivity of a photoconductive element.

In FIG. 1, light issuing from a semiconductor laser 20 is collimated into a parallel beam by a collimating lens 21 and then shaped by an aperture 32 to become a beam having a predetermined shape. This beam is compressed in the subscanning direction by a frist cylindrical lens 22 and then directed toward a polygon mirror 24. Having an accurate polygonal cross-section, the polygon mirror 24 rotated by a polygon motor 25, FIG. 1, at a predetermined speed in a predetermined direction. The rotation speed of the mirror 24 is determined on the basis of the rotation speed and writing density of a photoconductive drum 40 as well as the number surfaces of the polygon mirror 24.

The laser beam incident to the polygon mirror 24 is deflected by the mirror 24 toward f-theta lenses 26a, 26b and 26c. Functions assigned to the f-theta lenses 26a to 26c are scanning the drum 40 at a constant rate by the laser beam whose angular velocity is constant, focusing the light beam onto the drum 40 such that the beams forms a minimum light spot, and compensating for tilting.

In a position outside an image area, the laser beam coming out from the f-theta lenses 26a to 26c is reflected by a mirror 29 to reach a synchronization sensor 30. When a predetermined period of time expires since the synchronization sensor 30 has produced a synchronization signal representative of a head signal in the main scanning direction, one line of image data are delivered. The procedure is repeated thereafter to complete one full image.

Photoconductive Element Section

The photoconductive drum 40 has a photoconductive layer on its outermost periphery. In this embodiment, the photoconductive layer is implemented by an organic photoconductor (OPC) which is sensitive to the wavelength of 780 nanometers of a semiconductor layer, e.g. α-Si or Se-Te. As regards laser writing, while a negative/positive (N/P) process for illuminating an image area and a positive/positive (P/P) process for illuminating a background area are available, this embodiment uses the N/P process.

A charger 41 is provided with a grid adjacent to the drum 40 and uniformly charges the surface of the drum 40 to negative polarity. The laser beam illuminates an image area of the drum surface to lower its potential. As a result, a latent image is electrostatically formed in which the potential is about $-750$ volts to $-800$ volts in a background area and about $-500$ volts in an image area. A bias voltage of $-500$ volts to $-600$ volts is applied to a developing roller of any of developing units 42a and 42b to deposit negatively charged toner on the latent image, whereby the latent image is converted into a toner image.

Developing section

A main developing unit 42a and an auxiliary developing unit 42b are used in the illustrative embodiment. In a black-and-white reproduction mode, the auxiliary developing unit 42b and a toner container 43b associated therewith are removed. Specifically, a toner container 43a associated with the main developing unit 42a and the toner container 43b associated with the auxiliary developing unit 42b store black toner and color toner, respectively. The developing units 42a and 42b are selectively conditioned for development by, for example, changing the position of a main pole of one developing unit while the other developing unit is operated. This kind of development may be combined with the operation of the filter 6 and a multiple transfer function and a two-side copy function of a paper transport system in order to produce various kinds of color copies while editing color image data. Development in three or more colors may be implemented by three or more developing units which are fixedly arranged around the drum 40 or angularly movable to selectively reach a developing station.

The toner image produced by any of the developing units 42 a and 42b is charged by a transfer charger 44 from behind to positive polarity and thereby transferred to a paper which is fed in synchronism with the rotation of the drum 40. The paper with the toner image is subjected to AC discharge by a separation charger 45 which is held integrally with the transfer charger 44, whereby it is removed from the drum 40. Toner remaining on the drum 40 without being transferred to the paper is scraped off from the drum 40 by a cleaning blade 47 and then collected in a tank 48. Further, the potential pattern remaining on the drum 40 is erased by a discharging lamp 49.

A photosensor 50 is located immediately after the developing station. Constituted by a light-emitting element and a light-sensitive element, the photosensor 50 is adapted to measure the image density in terms of a ratio between the reflectivity of a pattern portion and that of the other portion which are defined on the drum 40 by writing a predetermined pattern (black pattern or dot pattern) in a position corresponding to the photosensor 50 and developing it. When the image density measured is low, the photosensor 50 produces a toner supply signal. That the density does not increase even after the supply of toner may show that the remaining amount of toner is short.

Paper Feed Section

In this embodiment, the paper feed section includes a plurality of cassettes 60a, 60b and 60c. A paper with a toner image may be routed through a re-feed loop 72 for producing a two-sided copy or for feeding it again. When any of the cassettes 60a to 60c is selected and then a start button is depressed, a feed roll 61 (61a, 61b or 61c) is rotated to feed a paper until the paper abuts against a register roller 62 which is in a halt then. Timed to an image position on the drum 40, the register roller 62 begins to rotate to drive the paper to feed the paper toward the periphery of the drum 40. After the toner image has been transferred from the drum 40 to the paper at a transfer station, the paper is transported by a separation and transport section 63 to a fixing roller pair which is constituted by a heating roller 64 and a pressing roller 65, the fixing roller pair fixing the toner image on the paper.

In a usual copy mode, the paper with the toner image fixed thereon is directed by a pawl 67 toward an outlet which adjoins the sorter (III). In a multi-copy mode, the paper is guided by the separator pawl 67 downward and, without being redirected by other selector pawls 68 and 69, routed through the loop 72 to reach the register roller 62 again. A two-sided copy mode may be selectively effected by the copier body (I) only or by the copier body (I) and the two-side reversal unit (IV). When only the copier body (I) is used, the paper directed downward by the selector pawl 67 is fed further downward by the pawl 68 and then guided by the pawl 69 toward a tray 70 which is located below the loop 72. Then, a roller 71 is actuated to return the paper toward the selector pawl 69 which, at this time, is oriented to guide the paper into the loop 72, so that the paper reaches the register roller 62.

ADF

The ADF (II) serves to automatically feed original documents one by one onto the glass platen 9 and then discharge them after they have been scanned. Specifically, documents stacked on a feed tray 100 are positioned in the widthwise direction by using a side guide 101. A feed roll 104 feeds one document at a time from the stack on the feed tray 100 and then a belt 102 transports the document to a predetermined position on the glass platen 9. After a desired number of copies have been produced, the belt 102 is actuated again to discharge the document to a discharge tray 103. The size of the document may be detected by sensing the position of the side guide 101 selected and counting the feed time.

Sorter

The sorter (III) is usable to distribute copies coming out of the copier body (I) to bins 111a to 111x in a manner well known in the art. By a plurality of rollers which are rotated by a motor 110, the copies are distributed to selected ones of the bins 111a to 111x depending upon the positions of pawls which are individually located in the vicinity of the bins.

Two-Sided Reversal Unit (IV)

The two-sided reversal unit (IV) helps the copier body (I) produce multiple two-sided copies collectively. Specifically, papers fed downward by the discharge roller 66 are guided by the pawl 167 into the two-sided reversal unit (IV). In the unit (IV), the papers are sequentially stacked on a tray 123 by a discharge roller 120 while being positioned by a feed roller 121 and a side guide 122. The papers on the tray 123 are sequentially fed out of the unit (IV) by a re-feed roller 124 when the timing for copying a document on their back is reached. At this instant, the papers are directly driven into the loop 72 by the pawl 69 and therefrom to the register roller 62. Further shown in FIG. 1 are a glass 23 for insulating sound, a mirror 27, a glass for intercepting dust, a main motor 80, and a fan motor 81.

Electrical Control Section

Figure 3A:
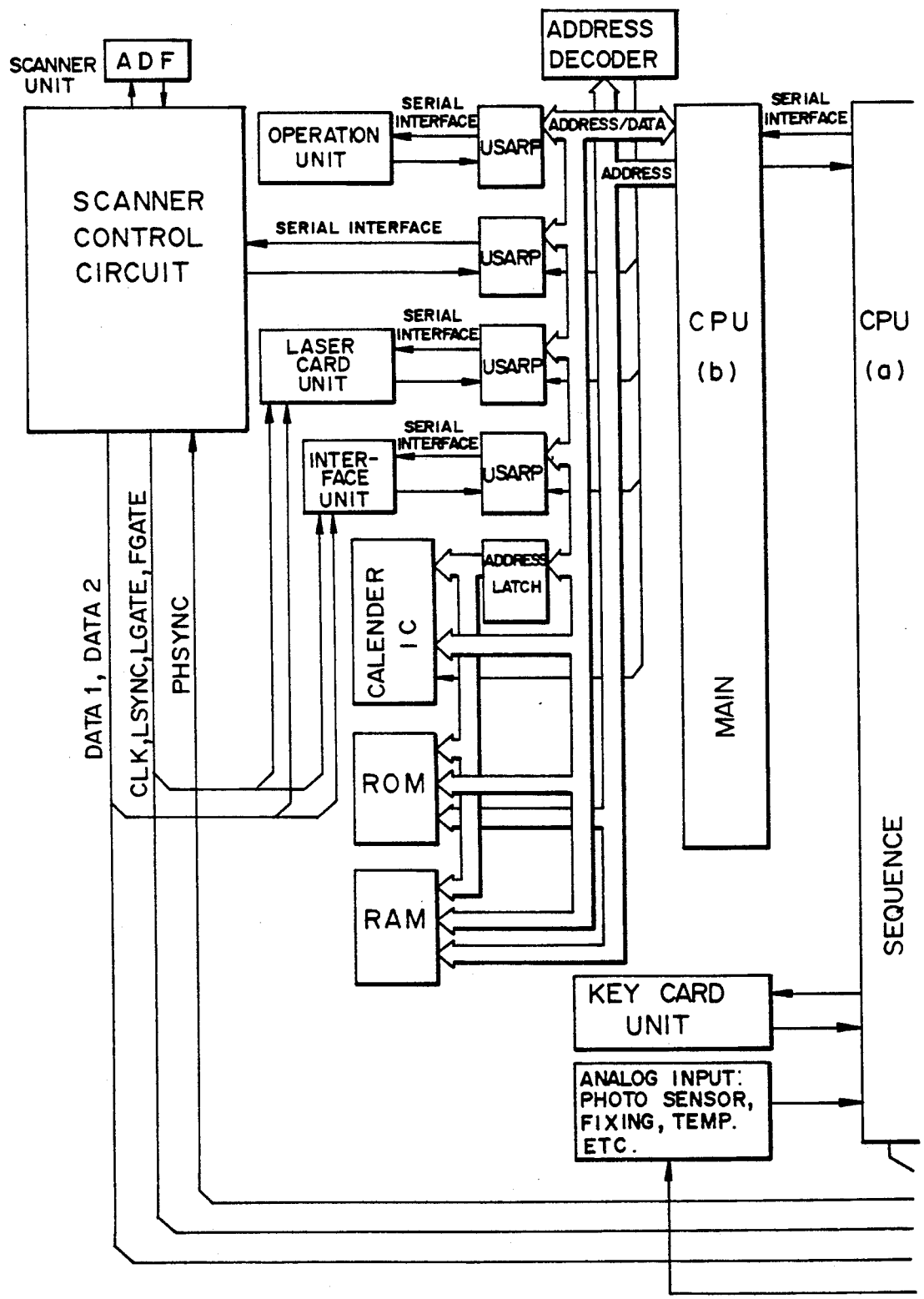
FIGS. 3a and 3b are schematic block diagrams which when combined show a printer section.
Figure 3B:
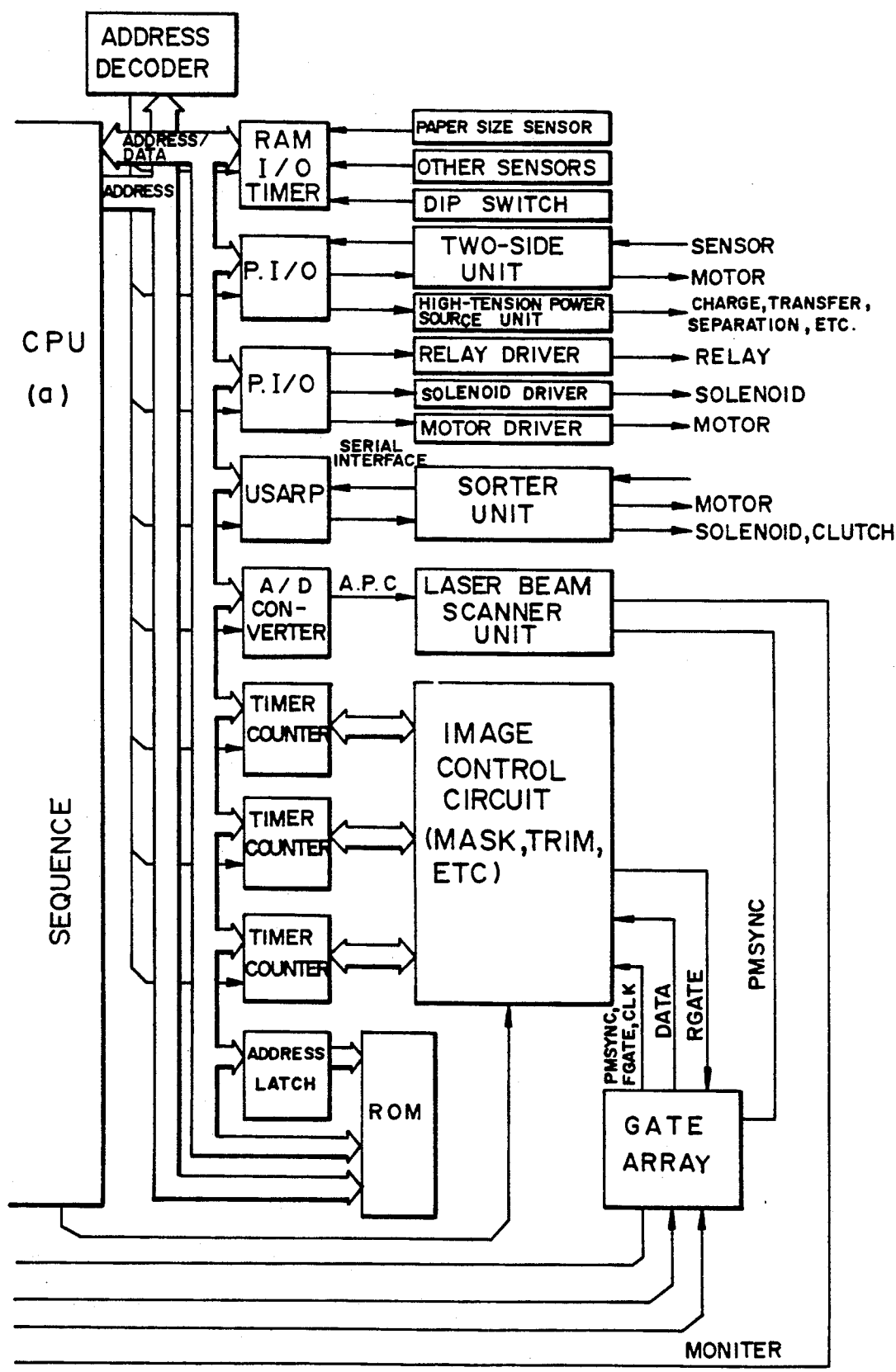

FIGS. 3a and 3b are block diagrams which in combination show the overall construction of the copier. It is to be noted that a central processing unit CPU (a) is shown in both of FIGS. 3a and 3b to show how the two figures should be combined. A control unit of the copier includes two CPUs (a) and (b) which are assigned to sequence control and operation control, respectively. The CPUs (a) and (b) are interconnected by a serial interface (RS232C).

Sequence control which is associated with paper transport timings will be described first. Connected to the CPU (a) are a paper size sensor, sensors responsive to the discharge, register and others of a paper, the two-side unit, a high-tension power source unit, drivers associated with relays, solenoids, motors and the like, the sorter unit, the laser unit, and the scanner unit. The paper size sensor produces an electric signal by sensing the size and orientation of papers which are loaded in its associated paper cassette. Also connected to the CPU (a) are an oil end sensor, a toner end sensor, a door open sensor, a fuse sensor, etc.

The two-side unit is provided with a motor for regulating the widthwise position of papers, a paper feed clutch, a solenoid for switching a transport path, a paper presence-absence sensor, a home position sensor responsive to the position of a side fence, various sensors associated with paper transport, etc. The high-tension power source unit applies a different predetermined high-tension power to each of the charger, transfer charger, separation charger, and developing electrode. The drivers are associated with a sheet feed clutch, register clutch, counter, motor, toner supply solenoid, power relay, fixing heater, etc. The CPU (a) is connected the sorter unit by the serial interface so that papers may be transported at predetermined timings into the bins in response to a signal from the sequence. Applied to an analog input of the CPU (a) are a fixing temperature, photosensor output, laser diode condition being monitored, and laser diode reference voltage. The fixing temperature is maintained constant by on-off control response to an output of a thermistor which is installed in the fixing section. As regards the photosensor output, a photosensor pattern produced at a predetermined timing is outputted by a phototransistor so that the CPU (a), based on the density of that pattern, couples and uncouples the toner supply clutch to control the toner density. To maintain the output power of the laser diode, an analog-to-digital (AD) converter and the analog input of the CPU are used. Specifically, the control is such that the voltage monitored when the laser diode is turned on becomes equal to a predetermined reference voltage (which is so selected as to cause the laser diode output power to the 2 milliwatts.

An image control circuit generates various timing signals associated with masking and trimming, erasure and photosensor pattern while delivering a video signal to the laser diode. A gate array functions to convert two-bit parallel image data which are outputted by the scanner into a one-bit serial signal in synchronism with a synchronizing signal PMSYNC which is generated by the scanner unit and a siganl RGATE which is repsentive of a write start position.

The CPU (b) assigned to the operation control, or main CPU, controls a plurality of serial ports and a calendar integrated circuit (IC). Connected to the serial ports are the operating section, scanner, facsimile transceiver, interface unit and the like as well as the sequence control CPU (a). The operating section includes indicators which are individually representive of the states of keys and the conditions of the copier. While data entered on the keys are serially sent to the CPU (b), the indicators are selectively turned on by serial outputs of the CPU (b). The CPU (b) interchanges data associated with image processing and image reading with the scanner and interchanges preset data with the facsimile section and interface unit. The calendar IC stores date and time so that the copier may be turned on and off based on those data.

Figure 4:
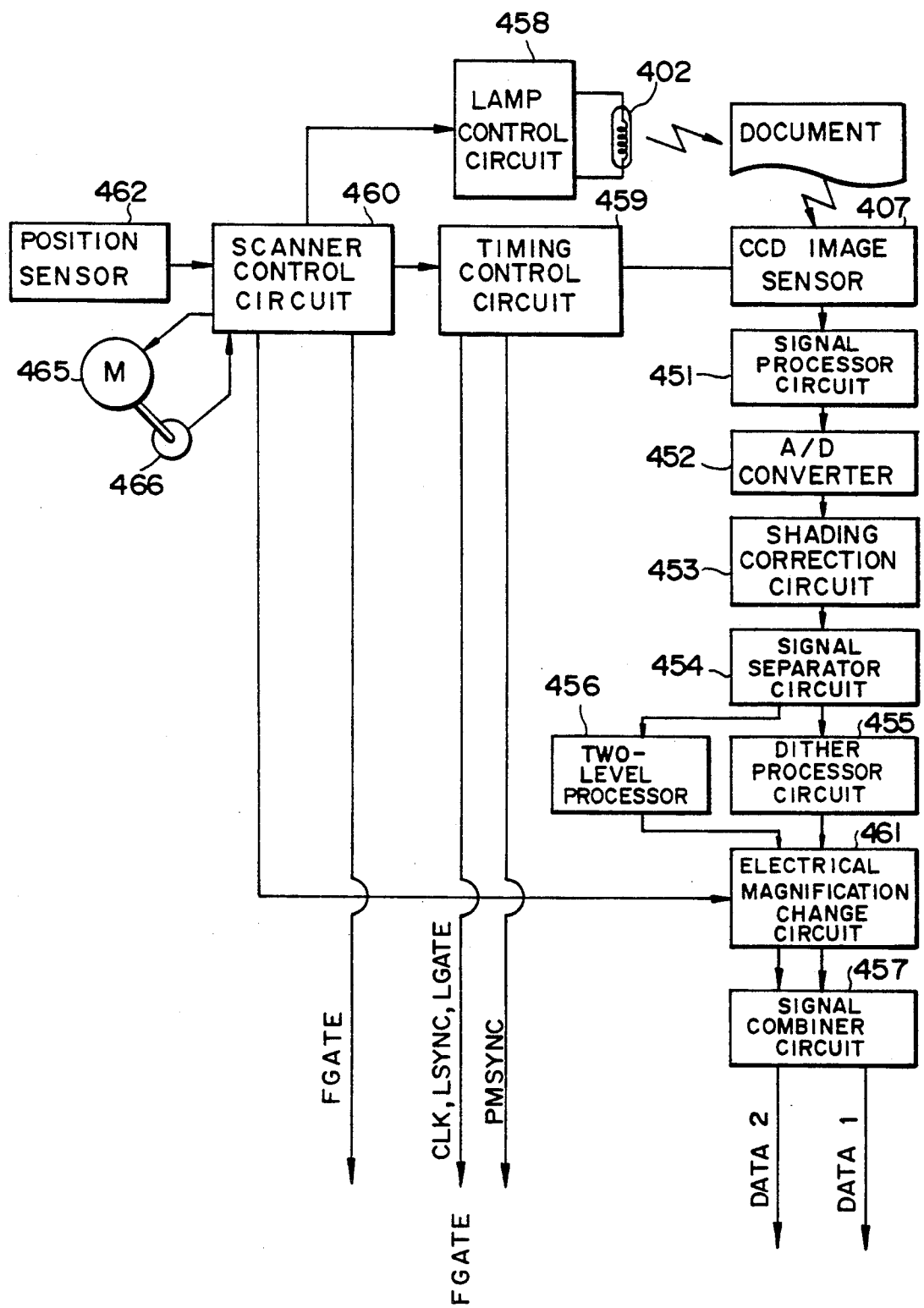
FIG. 4 is a schematic block diagram showing an image scanner section.

FIG. 4 is a block diagram of the image scanner section. An analog image signal outputtted by a CCD image sensor 407 is amplified by a signal processor circuit 451 and then converted by an AD converter 452 into a multi-level digital signal. This signal is routed to a shading correction circuit 453 and therefrom to a signal separator circuit 454. Processing the input image data, the signal processor circuit 454 separates characters and other two-level image components and halftone image components. While the image components are applied to a two-level precessor circuit, or binarizer, 456, the halftone image components are fed to a dither processor circuit 455. Using a predetermined threshold value, the two-level processor circuit 456 converts the input multi-level data into two-level data. The dither processor circuit 455 discriminates the input data by using various threshold value which are predetermined on a scanning point basis, thereby producing two-level data including halftone data. A signal combiner circuit 457 combines the two-level signal outputted by the two-level processor circuit 456 and the two level signal outputted by the dither processor circuit 455 so as to produce signals DATA1 and DATA2.

A scanner control circuit 460 controls a lamp control circuit 458, a timing control circuit 459, an electrical magnification change circuit 461, and a scanner drive motor 465 in response to commands which are applied therefrom from the printer control section. The lamp control circuit 458 turns on and off the lamp 402 and controls the quantity of light, as commanded by the scanner control circuit 460. A rotary encoder 466 is connected to the output shaft of the scanner drive motor 465, and a position sensor 462 senses a reference position of a subscanning drive mechanism. The electrical magnification change circuit 461 applies electrical magnification change processing to the image data undergone dither processing and the image data undergone two-level processing, on the basis of magnification data which is set by the scanner control circuit 460 and associated with the main scanning.

The timing control circuit 459 produces various signals in response to a command from the scanner control circuit 460. Specifically, as reading begins, the timing control circuit 459 delivers to the CCD image sensor 407 a transfer signal for transferring one line of data and a shift clock adapted to deliver data one bit at a time from the shift register. The timing control circuit 459 delivers to an image reproduction control unit a pixel synchronizing clock CLK, a main scanning synchronizing clock LSYNC, and a main scanning valid period signal LGATE. The pixel synchronizing clock CLK is substantially the same as the shift clock which is applied to the CCD image sensor 407. While the main scanning synchronizing clock LSYNC is substantially the same as a main scanning synchronizing signal PMSYNC which the beam sensor of the image writing unit produces, it is inhibited from appearing when an image is not read. The main scanning valid period signal LGATE has a (logical) high level, H, when the output data DATA1 and DATA2 are considered valid. In the illustrative embodiment, the CCD image sensor 407 produces 4,800 bits of valid data per line. The data DATA1 and DATA1 are associated with odd pixels and even pixels, respectively.

The scanner control circuit 460 responds to a read start command from the printer control section by turning on the lamp 402, driving the scanner drive motor 465, and controlling the timing control circuit 459 to thereby cause the CCD image sensor 407 to start reading an image. Simultaneously, the scanner control circuit 460 turns a subscanning valid period signal FGATE to a high level. This signal FGATE becomes a low level, L, as a period of time necessary for scanning a maximum reading length (lengthwise dimension of a paper of format A in the illustrative embodiment).

The CCD uses 5,000 pixels and is capable of reading at the rate of 400 dpi [(15.7 lines per millimeter) 297 (lateral dimension of A3)×15.7 (lines per millimeter)=4662.9 lines]. The output signals of the CCD are divided into an odd and an even group and then amplified. This is to match the operable range of a differential amplifier to the period of time per pixel which is extremely short. The signals EVEN and ODD are combined by a 9.6 MHz switching device to become a serial analog signal.

Subsequently, the degree of amplification of the image signal is corrected by automatic gain control (AGC). Specifically, to compensate for the fluctuation of the luminance of the fluorescent lamp (due to temperature variation, aging, etc.), the CCD reads a reference or white plate located at the home position of the scanner before outputting image data and thereby indicates a degree of amplification (the output is maintained constant by increasing the amplification if the luminance is low and decreasing it if the luminance is high). This signal is converted into a digital signal by a circuit of FIG. 36 to be delivered as 6-bit data (sixty-four tones). The digital signal is subjected to shading correction at a light amount detection and shading correction timing control section and then binarized by a binarizer. At this instant, both the simple binarization and the binarization which uses a dither matrix are effected at the same time.

Figures 38, 39:
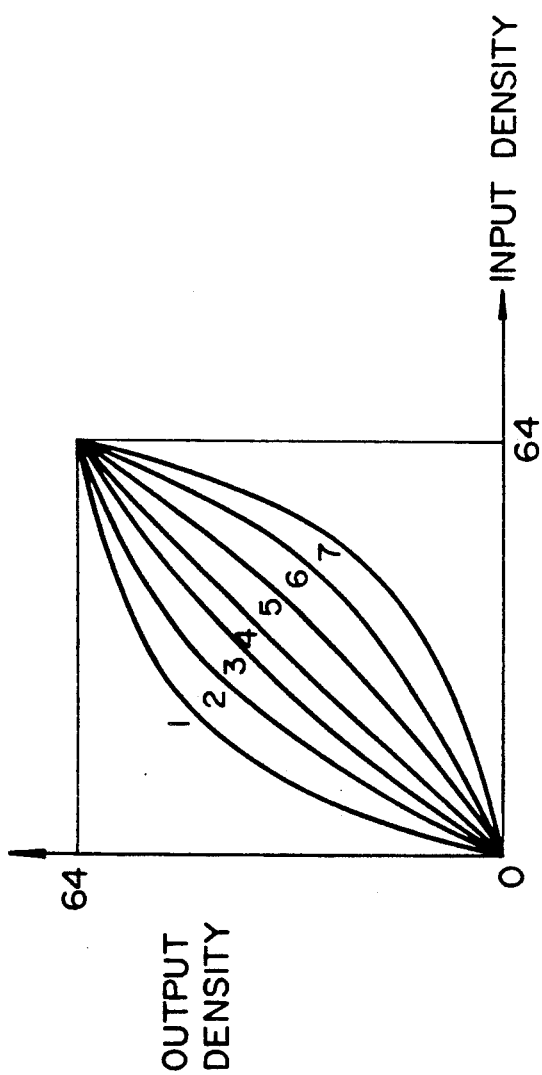
FIG. 38 is a table showing a relationship between density adjusting notches and threshold levels.
FIG. 39 is a plot showing the characteristics of density adjusting notches.

The simple binarization is such that the 6-bit pixel data (64 tones) are compared with data which are stored in a ROM beforehand and thereby determined whether they are black or white. In this case, threshold levels are determined in relation to notches, as shown in FIG. 38. Any of the density notches is selected by manipulation of the operating section, and a mode is serially transferred from the CPU to the scanner CPU at the start of a copying operation. Based on the notch, a density control notch (DEN) is set to 1 to 7 while, at the same time, threshold levels are produced from the ROM.

On the other hand, the binarization which uses a dither matrix is such that the 6-bit data (64 tone data) are compared with data which are stored in a ROM of a dither matrix table beforehand and thereby determined whether they are black or white. In this embodiment, an 8×8 dither matrix table is used to render sixty-four different tones. The notch adjustment is implemented by the selection of a dither matrix pattern. An 8×8 dither matrix tables is associated with each of the notches whose characteristics are shown in FIG. 39, whereby copy density is determined.

Figure 37:
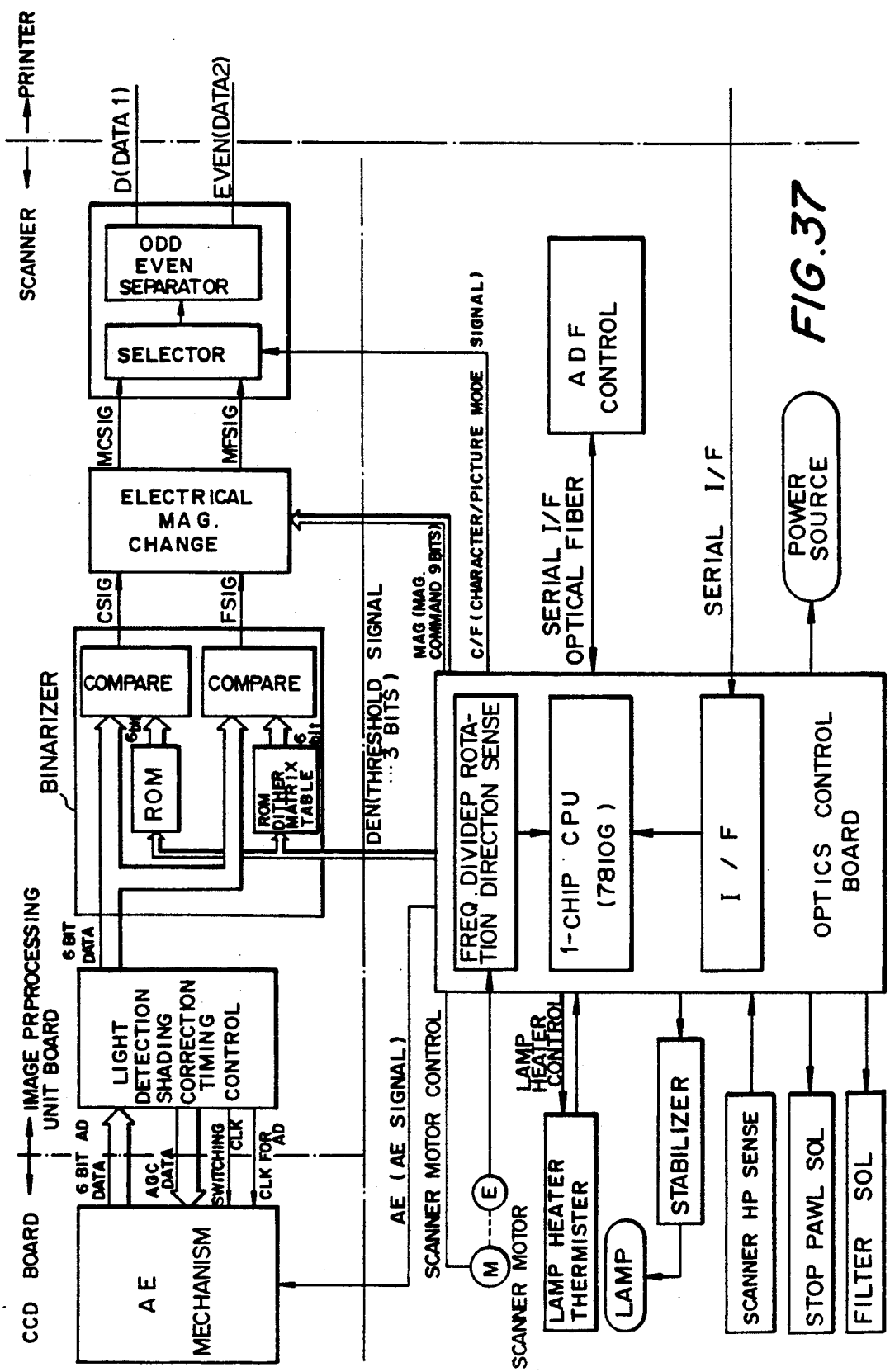
FIG. 37 is a schematic block diagram representative of control.

As shown in FIG. 37, a simple two-level signal CSIG and a dither-processed two-level signal FSIG which are outputted by the binarizer are individually electrically changed in magnification to produce signals MCSIG and MFSIG. Magnification change data for such electrical magnification change are also fed from the main CPU at the start of a copying operation, so that 9-bit data are fed to a MIG to be changed in magnification on the basis of the magnification change data. In a picture mode, a selector selects the signal MFSIG and thereby a picture mode in response to a C/F signal so that the MFSIG data are delivered as a final output. In a character mode, the MCSIG are delivered as a final output. The C/F signal depends upon the mode which is determined by the operating section at the start of a copying operation.

Figure 36:
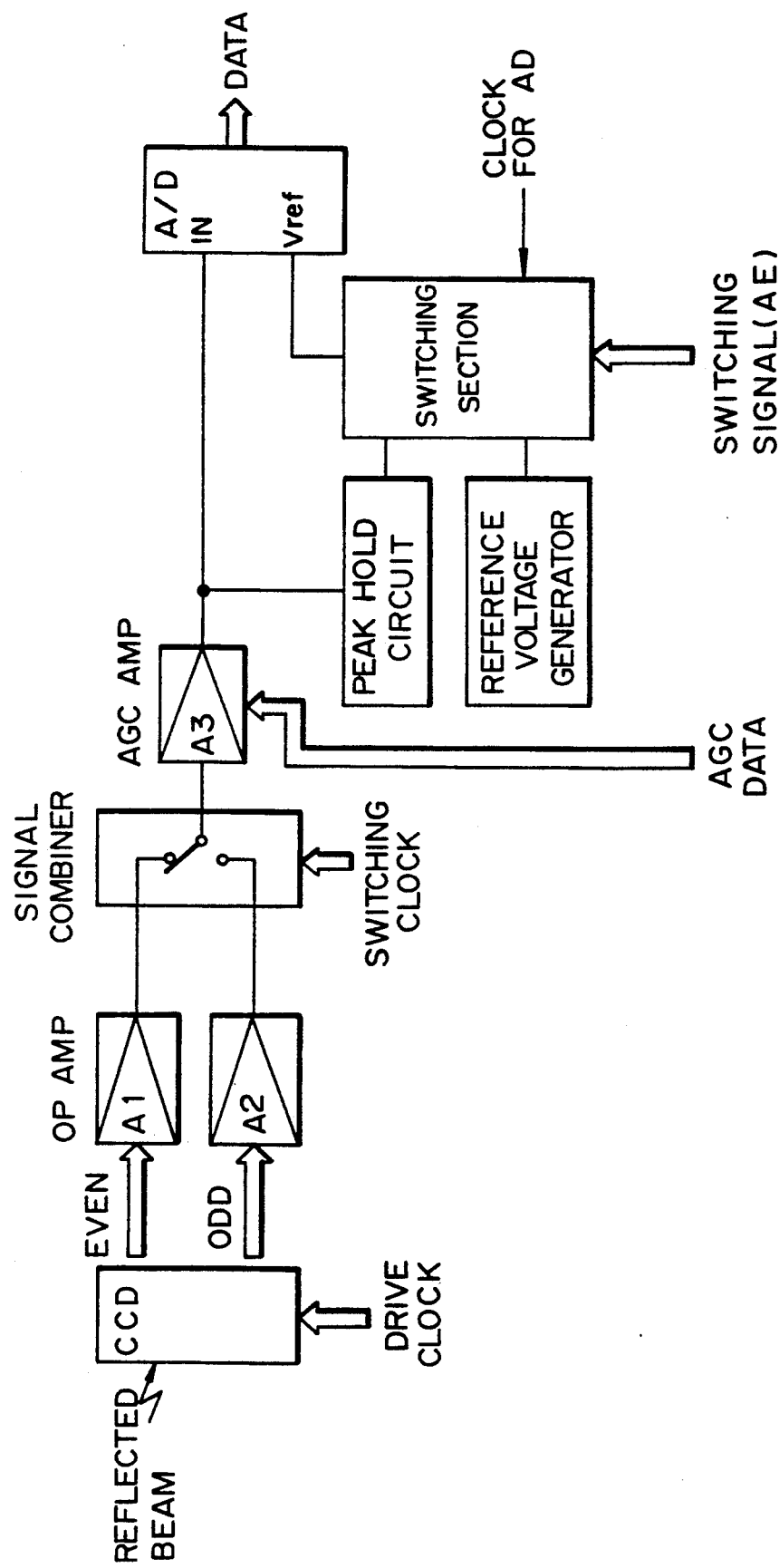
FIG. 36 is a schematic block diagram showing a background removing (AE) mechanism.

FIG. 36 is a block diagram showing a mechanism for erasing the background (AE). In the AE mechanism shown in FIG. 36, the peak value of an output voltage (analog image data) outputted by an AGC amplifier (A3) is detected. An AD converter converts the output of the AGC amplifier into a digital level by using the lightest portion of document data as a reference. Hence, even when the background of a document has relatively high density, it is not read, i.e., only the image data are outputted. It is to be noted that the reference voltage Vref applied to the AD converter is fixed and equivalent to the white level which is derived from the reference plate. That is, it is not that the reference voltage Vref is not determined by reading the voltage associated with the reference plate but that it is fixed to a voltage equivalent to the reference plate at the assembly stage.

Figure 40:
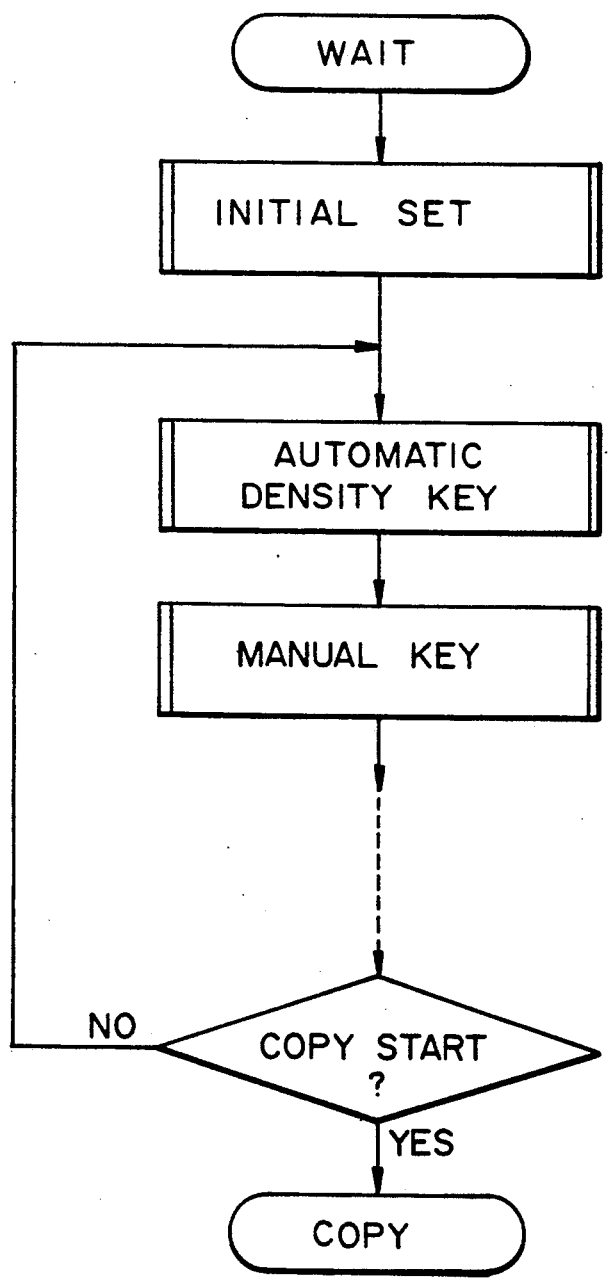
FIG. 40 is a flowchart representative of a wait routine.

FIG. 40 shows a wait mode for checking and displaying keys which are waiting. Specifically, an automatic density key and a manual density key are checked by this routine. The input and display of the keys are effected by using the serial interface between the main CPU and the operating section CPU without exception.

Figure 41:
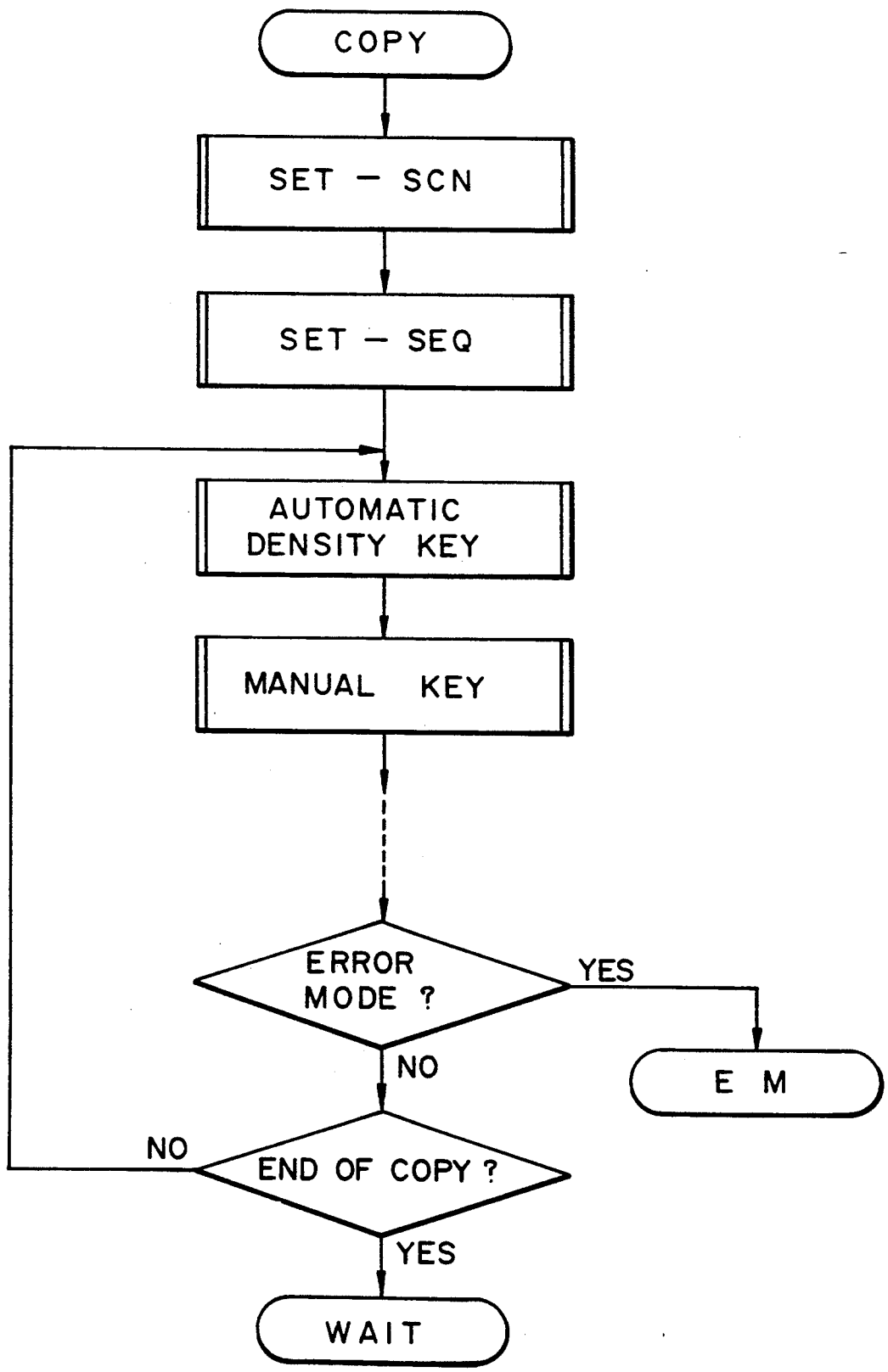
FIG. 41 is a flowchart representative of a copy routine.

FIG. 41 is a flowchart representative of a copy routine. Upon the transfer to this routine, data entered in the wait mode routine are fed to the scanner to start it. In the routine "SET-SEQ" is representative of a step for delivering the number of copies, a sheet feed step and the like to the sequence CPU of the printer section.

Figure 42:
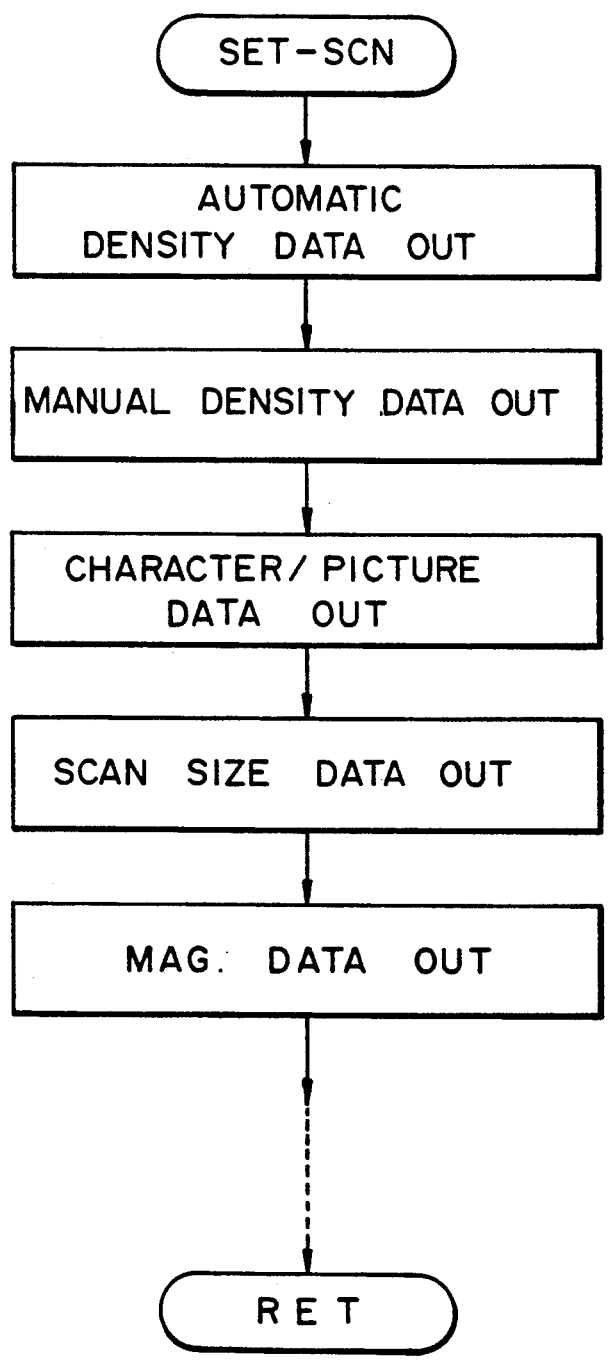
FIG. 42 is a flowchart demonstrating a SCN routine.

FIG. 42 shows a set SCN routine for delivering to the scanner the modes which are set up during the wait mode. When an automatic density LED is turned on with the other density LEDs turned off, density "4 (intermediate)" is fed to the scanner Specifically, the automatic density data is fed to AE shown in FIG. 37, the density data is fed to DEN, the character/picture data is fed to C/F, and the magnification data is fed as a signal MAG.

A characteristic feature of the present invention is that the AE mode in which an image is digitally processed to erase the background and the manual mode in which the density of an image is variable as desired can be set up independently of each other.

Details of control which occurs in the copy mode will be described.

Figure 5:
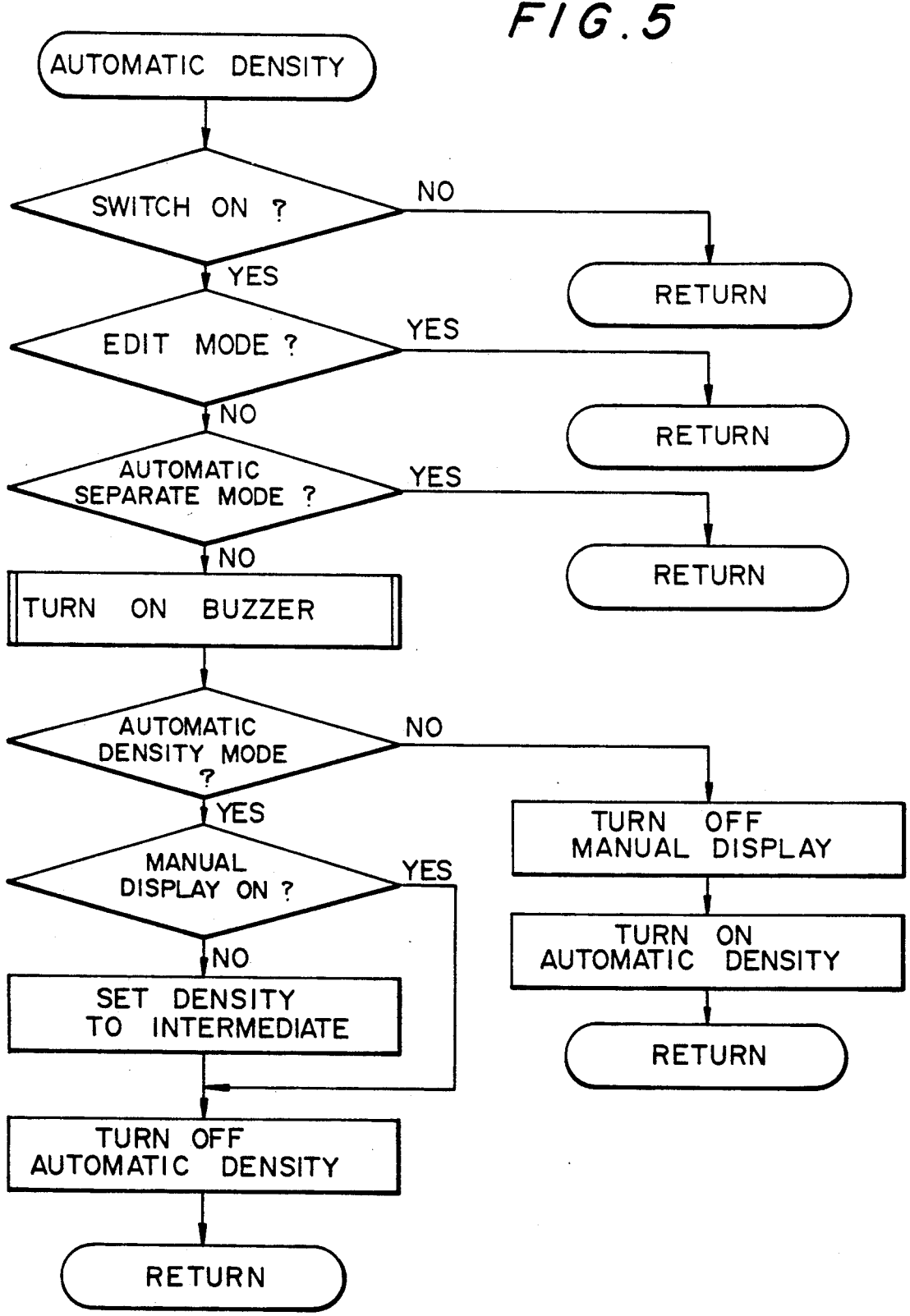
FIG. 5 is a flowchart demonstrating an automatic density setting procedure.

Referring to FIG. 5, a flowchart representative of automatic density setting is shown. When an automatic density switch is pressed, the key input is accepted and a buzzer is energized if the current mode is neither an edit mode (outline and marker) nor an automatic separate mode. If the automatic density mode has been set up and if a manual mode indicator is on, an automatic density LED indicator is turned off. If the manual indicator is off, the manual notch "4 (medium density)" is selected and the automatic density mode is cleared. When the automatic density mode is off, the manual LED indicator is turned off and the automatic indicator is turned on.

Figure 6:
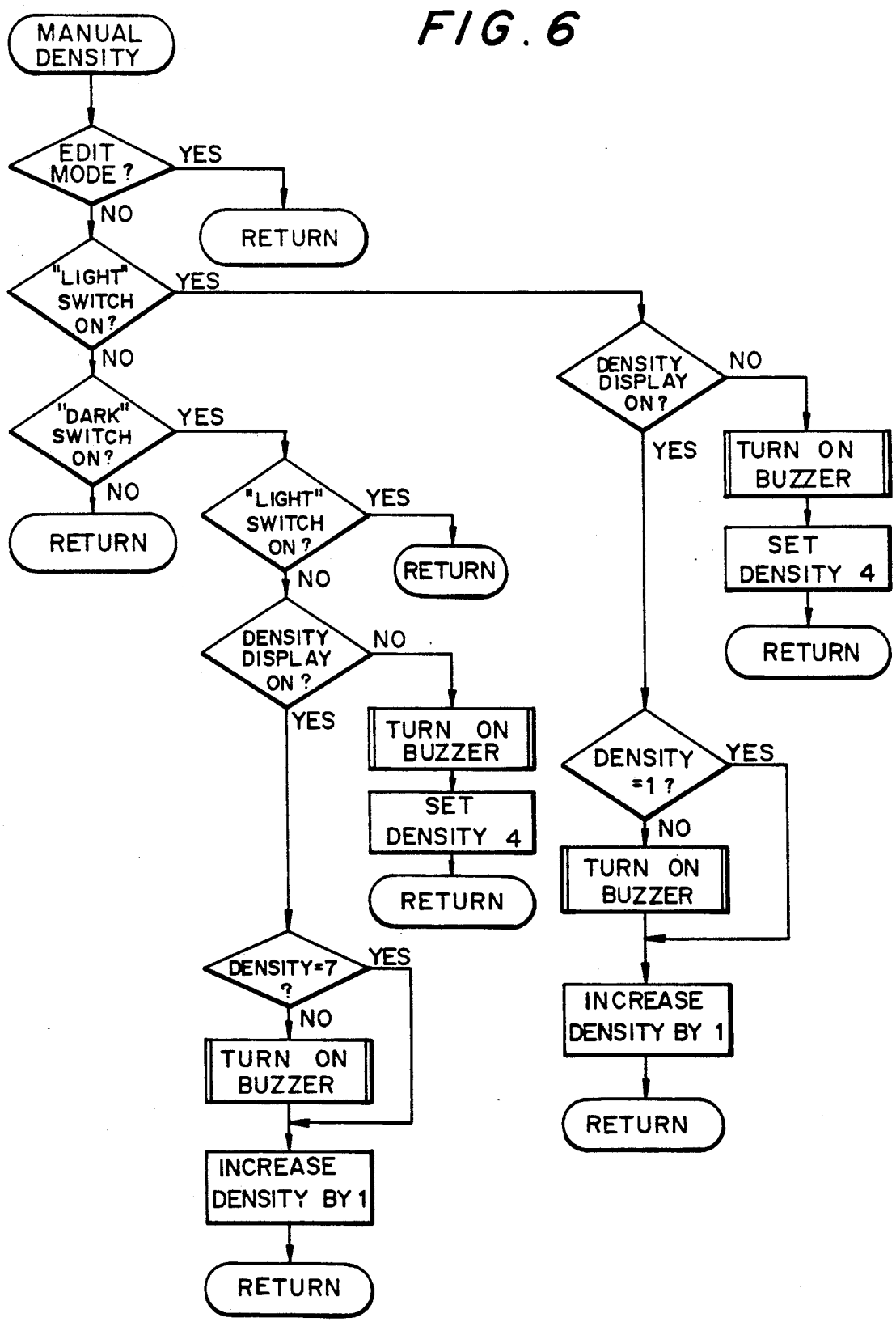
FIG. 6 is a flowchart demonstrating a manual density setting procedure.
Figure 7:
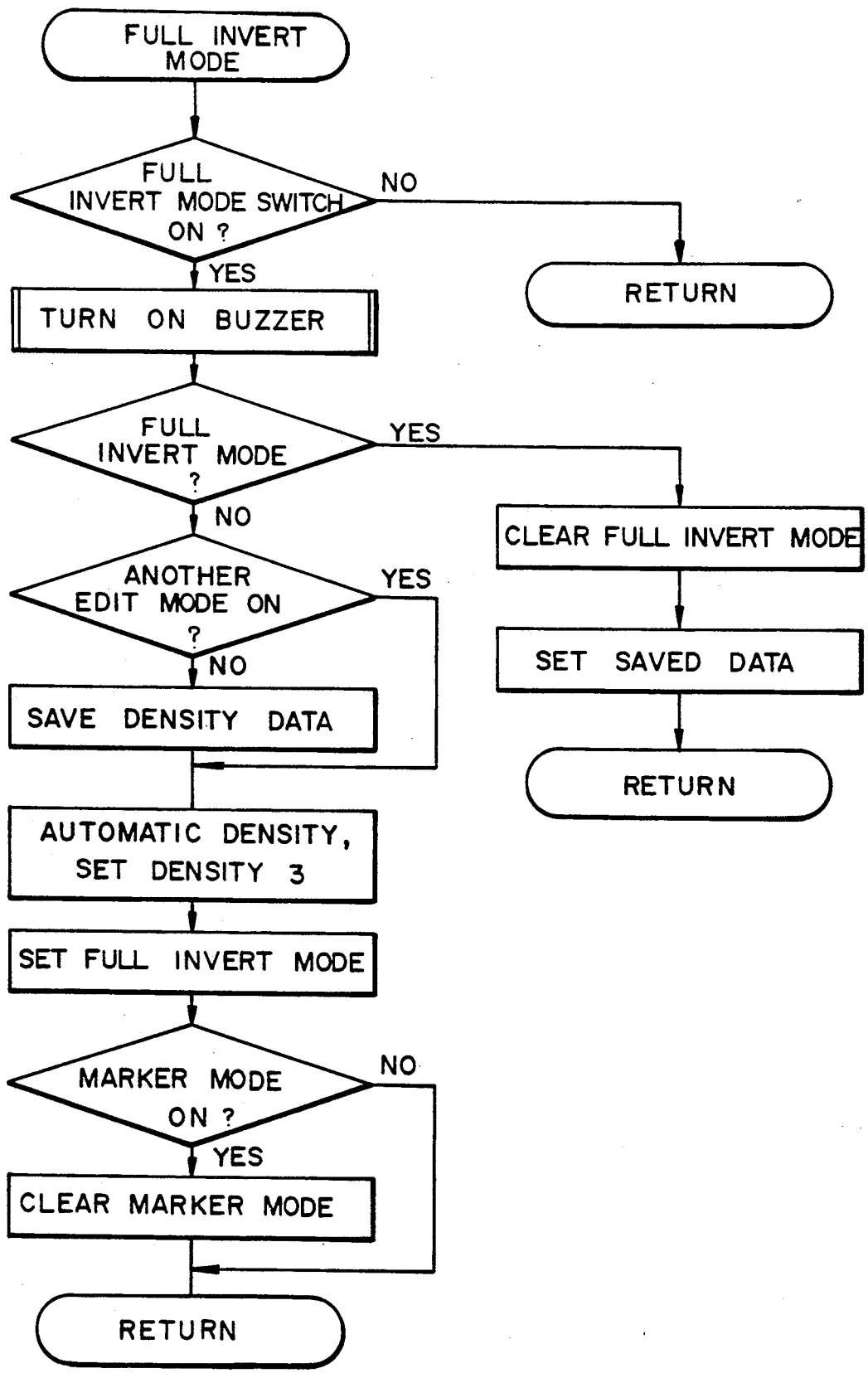
FIG. 7 is a flowchart representative of a full-face inversion mode.
Figure 8:
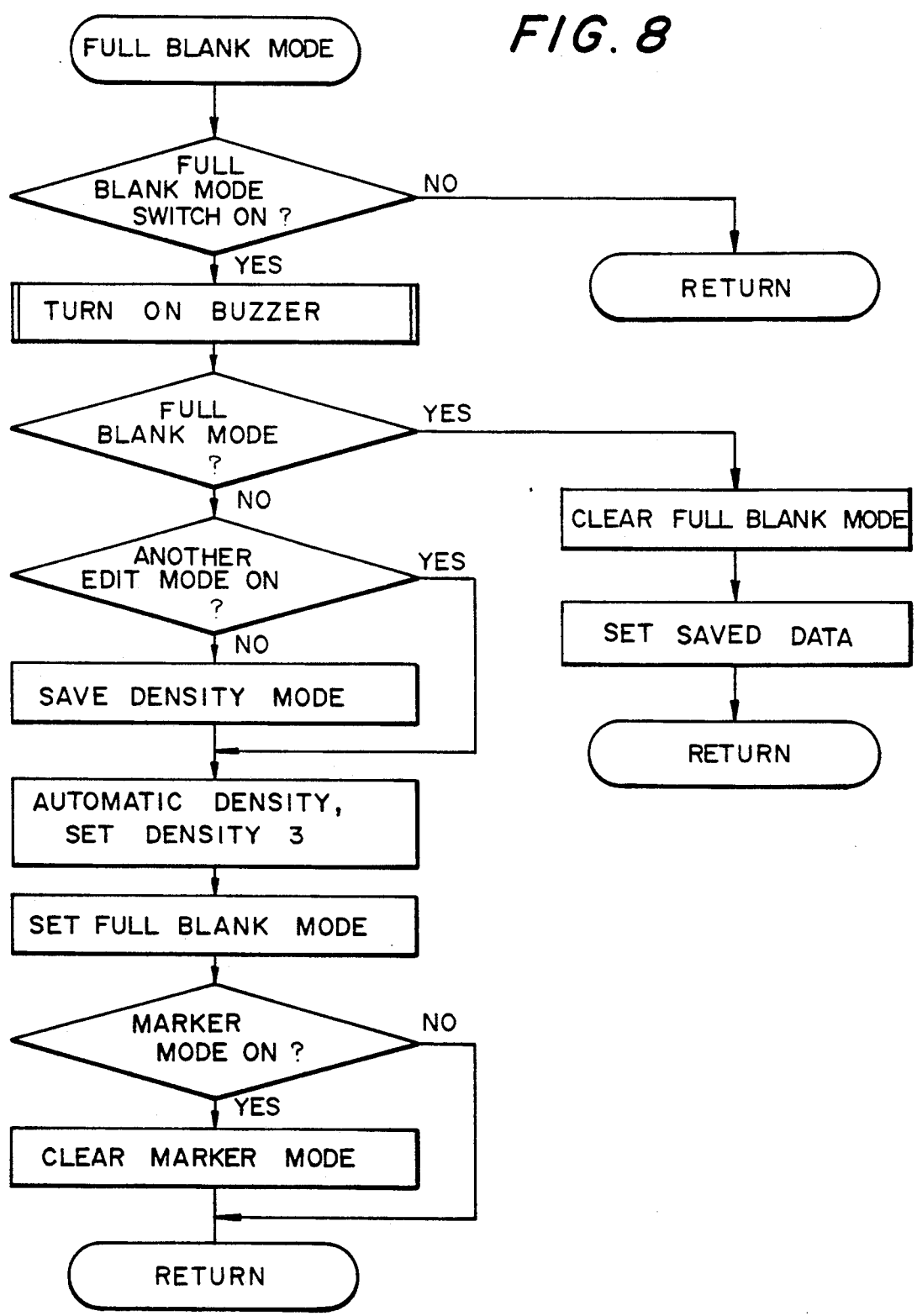
FIG. 8 is a flowchart representative of a full-face blank mode.
Figure 9:
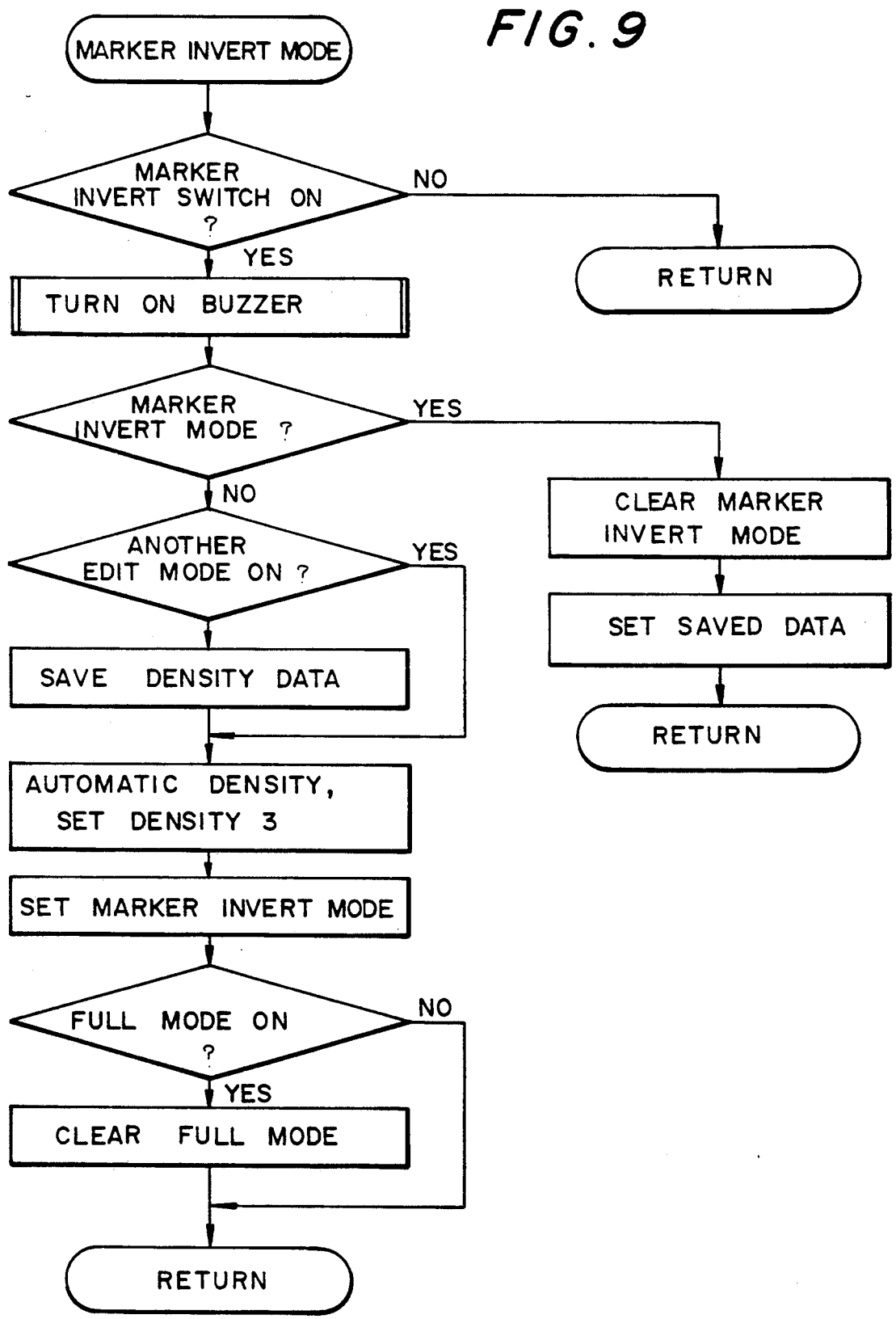
FIG. 9 is a flowchart representative of a maker invert mode.
Figure 10:
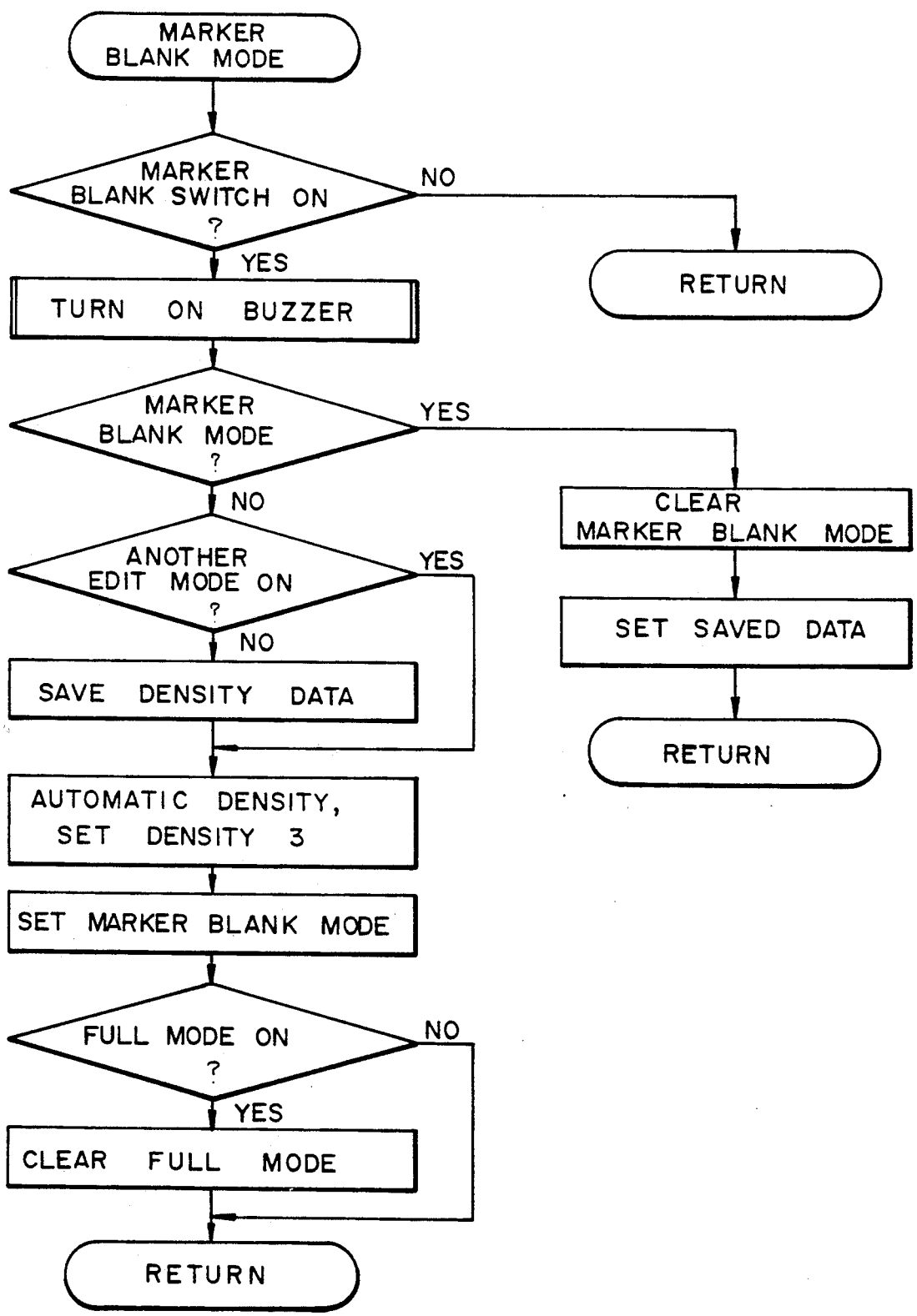
FIG. 10 is a flowchart showing a marker blank mode.
Figure 11:
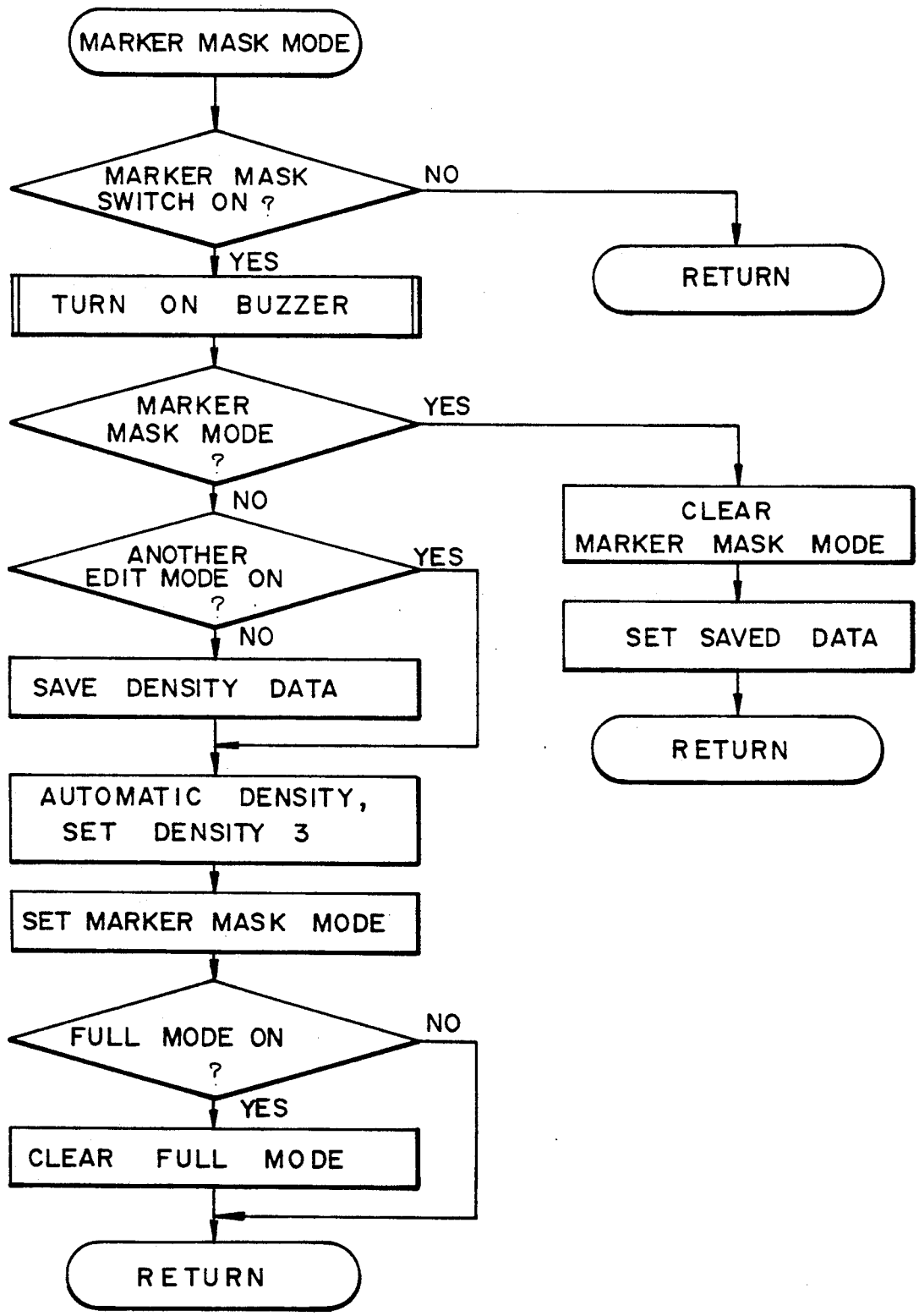
FIG. 11 is a flowchart showing a marker mask mode.
Figure 12:
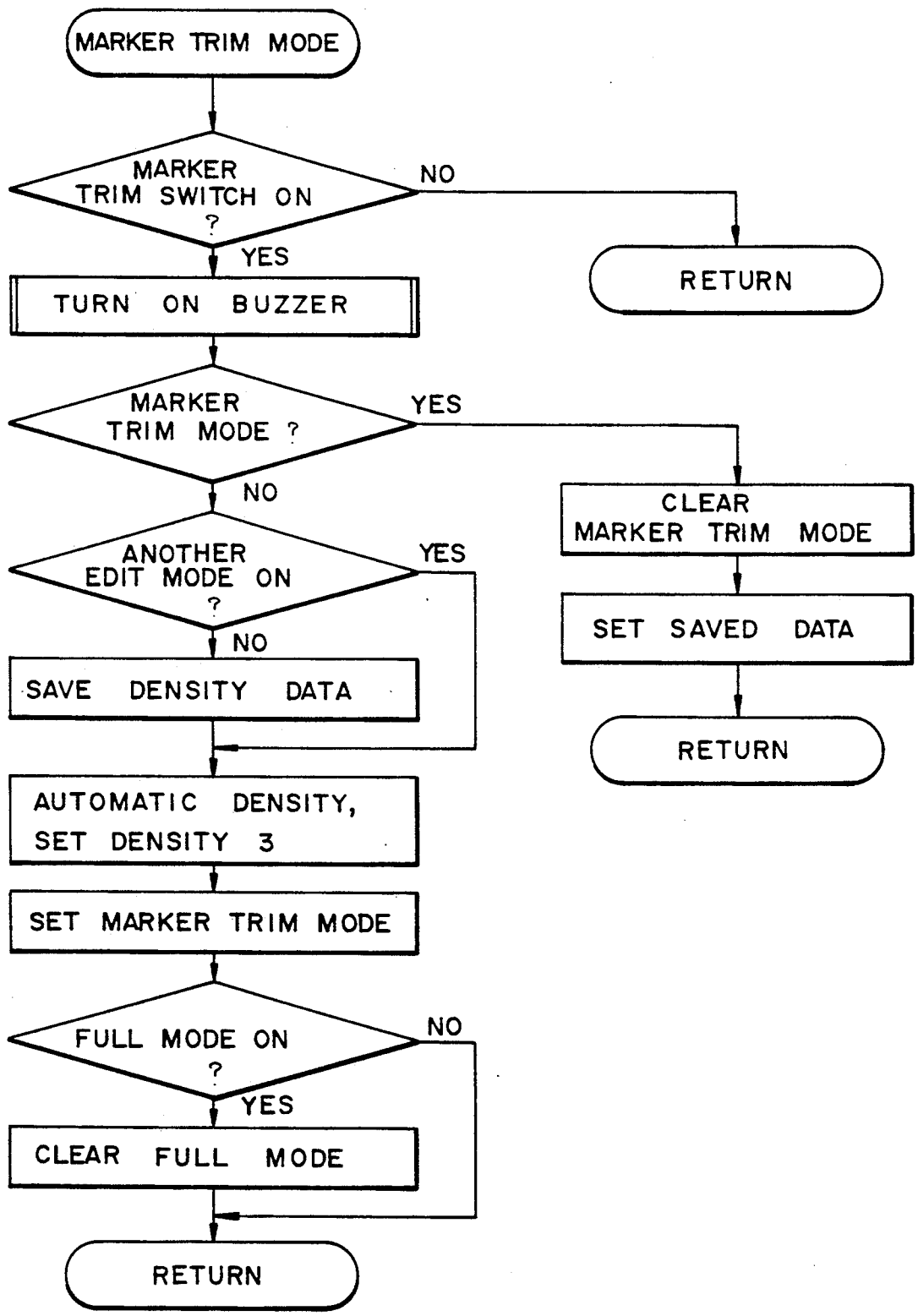
FIG. 12 is a flowchart showing a marker trim mode.

Referring to FIG. 6, a procedure for manually setting density is shown. In the edit mode, the input on the manual density switch is not accepted. When a LIGHT switch is pressed, if the density display has already been turned on, the density is shifted by one notch to the lower density side as represented by an upper part of a condition [1] or an upper part of a condition [3] which are shown below. If the density display is off, the notch "4 (medium)" is turned on as represented by a left part of a condition [2]. Likewise, when a DARK switch is pressed, density is shifted by one notch to the darker side if the density display is on, and the intermediate notch "4" is turned on if the density display is off.

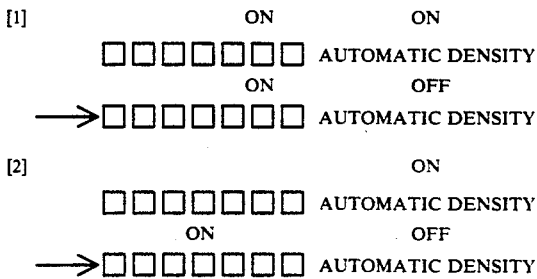

-continued

[3]    ON                    OFF

   AUTOMATIC DENSITY

ON

→ ☐☐☐☐☐☐☐ AUTOMATIC DENSITY

As shown above, even in the automatic density mode, the notch may be manually changed to produce a desired copy.

FIGS. 7 to 12 show various kinds of edit mode setting. As shown in any of the figures, when a switch is pressed, a buzzer is energized. If the particular mode associated with the switch has been set up, that mode is cleared and density data which has been saved at the time of entering into the edit mode is set. If the mode has not been set up, the mode is set up; when the edit mode is set up for the first time, density data before entering into that mode is saved and optimum density for the edit mode is set again (notch "3" in the case of automatic density mode). This is to prevent the trace of a marker from appearing on a copy when the marker is used. Assuming that the subsequent mode is a full-face mode, if a marker mode has been set up, the marker mode is cleared; assuming that the subsequent mode is a marker mode, if a full-face mode has been set up, the full-face mode is cleared. This is because when a marker is to be used for inversion or blanking, it is needless to invert or blank the whole image and because, when the whole image is to be inverted or blanked, it is needless to effect blanking or inversion with a marker.

In accordance with the illustrative embodiment, a digital copier control system is provided which allows optimum density to be selected when an image is to be edited. Density data before such editing is commanded can be saved and then set again after the editing. When the full-face editing is commanded, the partial edit mode can be cleared; when the partial editing is commanded, the full edit mode can be cleared.

Figure 13:
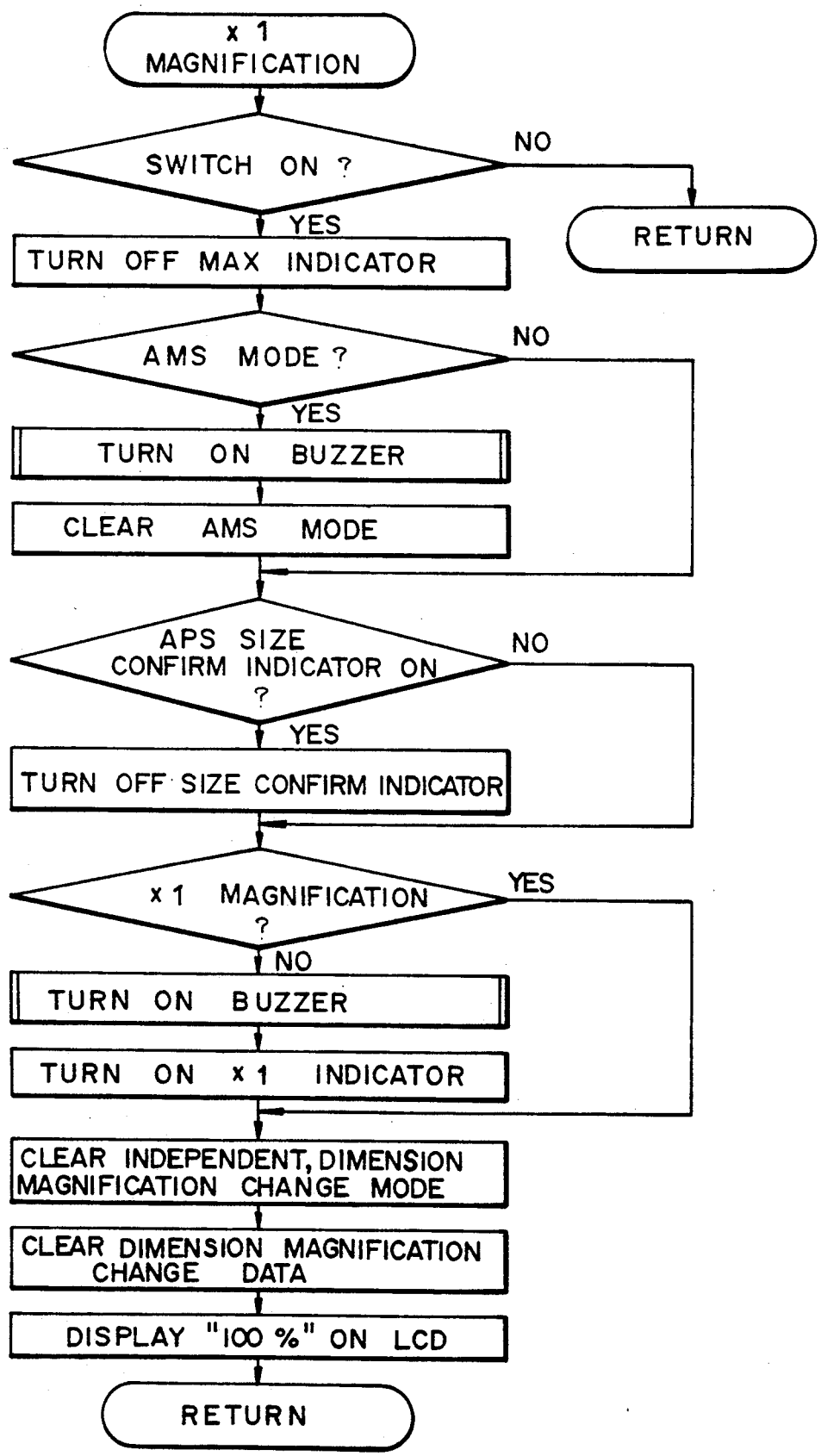
FIG. 13 is a flowchart showing a x1 magnify mode.

FIG. 13 shows a flowchart representative of a xl mode. When a xl switch is turned on, a MAX and a MIN display each showing data on the basis of independent dimension magnification change are turned off. Simultaneously, if automatic magnification selection (AMS) has been set up, it is cleared; if automatic paper selection (APS) has been set up, it is also cleared. If the xl magnification mode has already been set up, a buzzer is not energized. Further, an independent and a dimension magnification change mode are cleared, dimension magnification change data (longitudinal and lateral dimensions of a document and those of a paper) are cleared, and "100%" appears on the first line of the LCD.

Figure 14A:
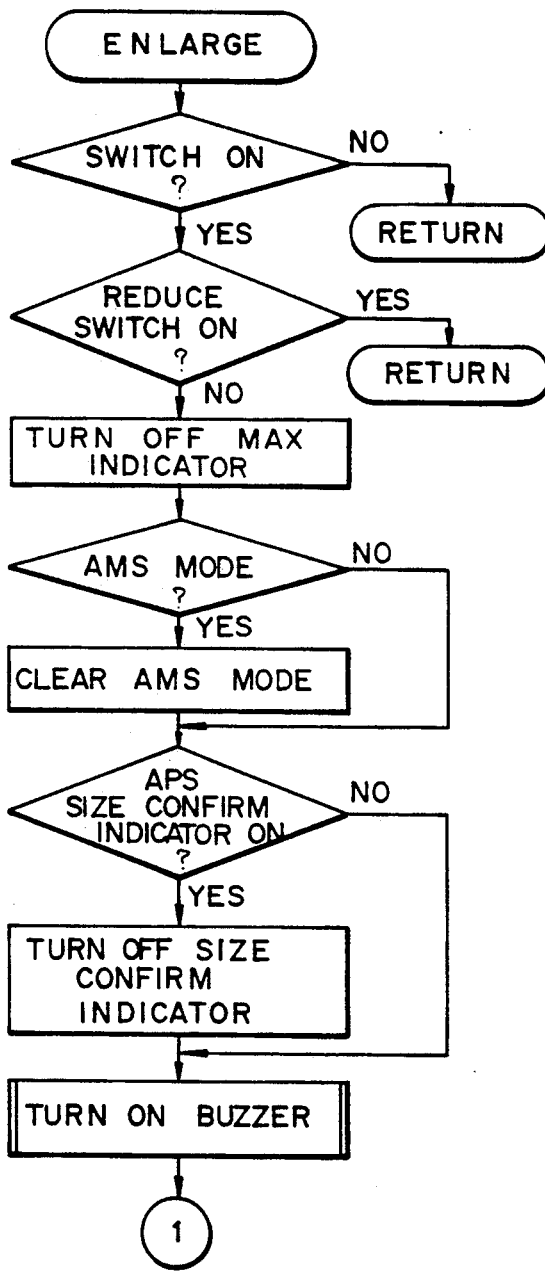
FIG. 14a is a flowchart showing an enlarge mode.
Figure 14B:
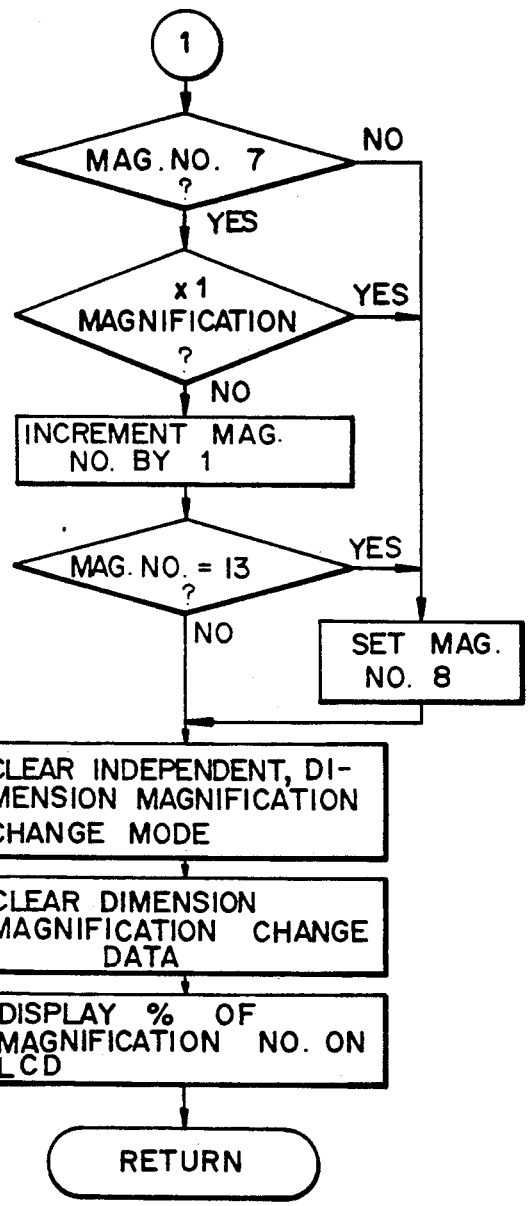
FIG. 14b is a flowchart showing a relationship between magnification Nos. and magnifications.

FIG. 14a shows a procedure representative of an enlarge mode. When a reduce mode is turned on simultaneously with the manipulation of an enlarge switch, no operation occurs. As in the case of the xl mode. AMS and APS processings are executed to energize the buzzer. When the magnification is xl, reduction, independent longitudinal and lateral magnification or zoom 400%, "115%" is set; otherwise, a magnification higher by one step than the fixed magnification being displayed is set. The independent mode and the dimension magnification change mode are cleared, and the dimension magnification change data are erased. At this time, a magnification such as "115%" appears on the first line of the LCD. FIG. 14b shows a relationship between magnification Nos. which are shown in the flowcharts and the magnifications.

Figure 15:
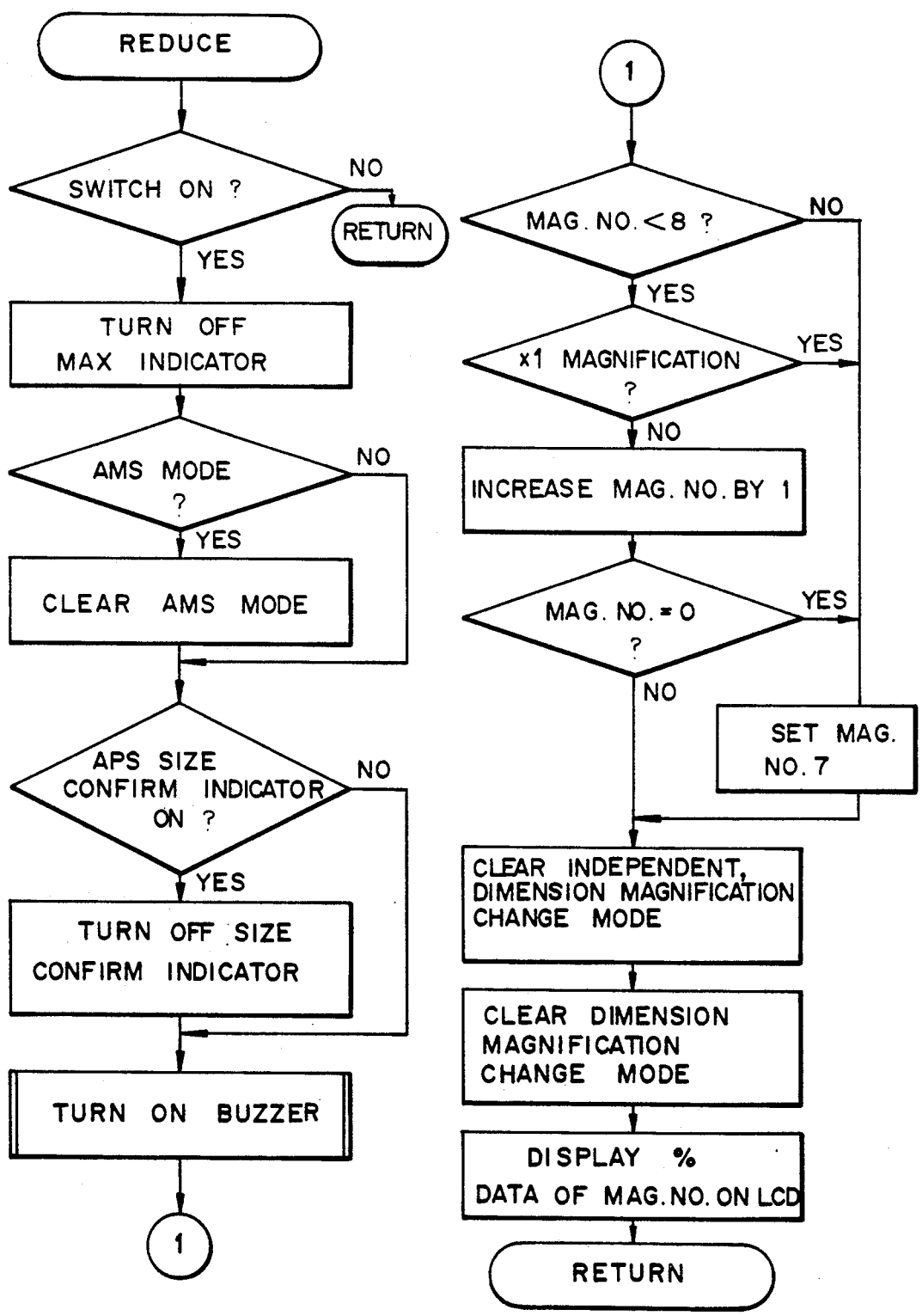
FIG. 15 is a flowchart representative of a reduce mode.

FIG. 15 is a flowchart demonstrating a reduce mode. When the magnification is xl, independent longitudinal and lateral magnification, zoom 25%, "93%" is set; otherwise, a magnification lower by one step than the fixed magnification being displayed is set. The rest of the procedure is the same as in the enlarge mode.

Figure 16A:
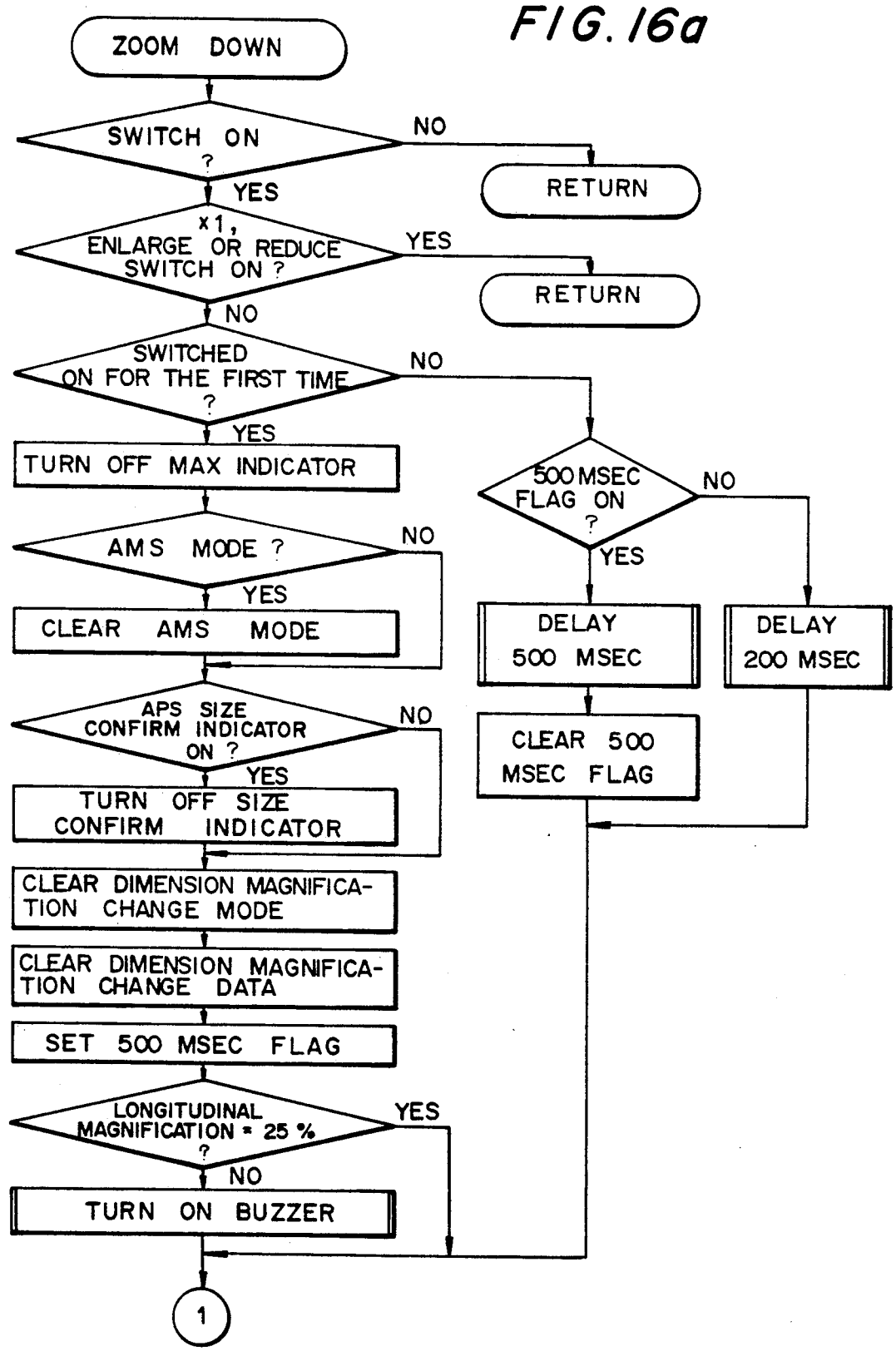
FIGS. 16a and 16b are flowcharts demonstrating a zoom down mode.
Figure 16B:
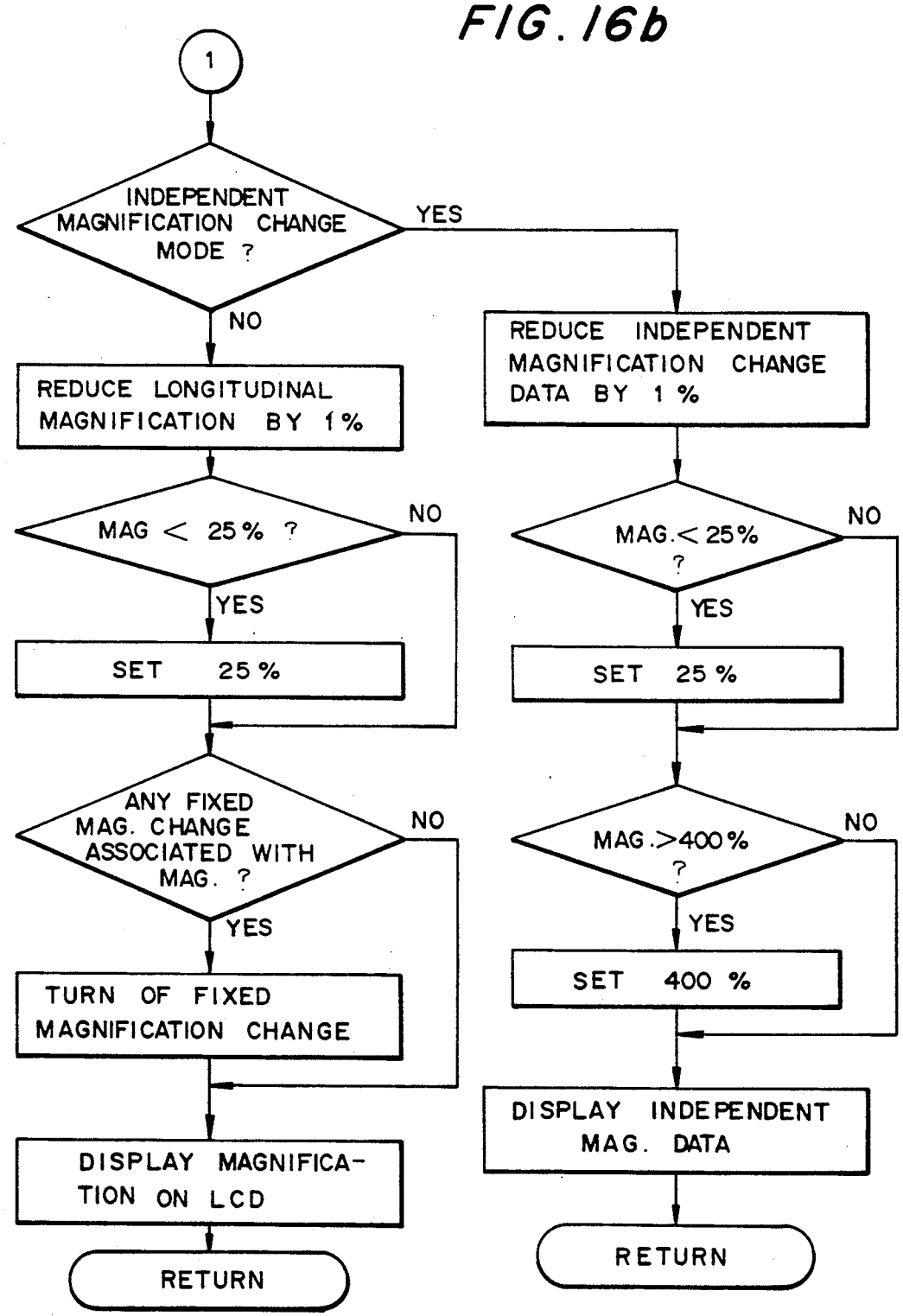

FIGS. 16a and 16b are flowcharts showing a zoom down (−) mode. When any of the enlarge, reduce and xl keys are pressed, the operation of the zoom key is not accepted. When the zoom key is pressed for the first time, AMS and APS processings are effected to clear the dimension magnification change mode as well as dimension magnification change data. A 500 msec flag is set and, if the magnification is 25%, the buzzer is not energized. In the case of a mode other than the independent magnification change mode, the magnification is reduced by 1%. If fixed magnification change which corresponds to the resulting magnification exists, a fixed magnification change display associated therewith is turned on. The magnification such as "91%" is indicated on the first line of the liquid crystal display. Here, the display may be provided in any of three different manners as shown below:

(1) 1st Line 100%→99%
(2) Long. 125% Lat. 90%→124%
(3) →89%

The method (1) shown above is used to zoom down when the independent magnification change mode is not set up. When the zoom key is pressed while the independent magnification change mode is set up, the method (2) is adopted for zooming down by using the longitudinal dimension as a reference, resetting the independent magnification change, and setting up the usual magnification change mode. The method (3) is adapted to zoom down by using the lateral dimension as a reference.

Although not shown in the flowcharts, a method which zooms down in both of the longitudinal and lateral directions is available in the independent magnification mode, as shown below:

(4) Long. 125% Lat. 90%→Long. 124% Lat. 89%

The method (4) is extremely effective when a person sets up a magnification in the independent magnification change mode or the dimension magnification change mode, then obtains copies, and then desires to slightly change the magnification.

The zooming methods (2), (3) and (4) available in the independent magnification mode are memorized by a dip switch, a memory back-up, etc. In the independent magnification change mode, the independent magnification data are sequentially reduced. Specifically, when a magnification of less than 25% is set (in this particular mode, magnification data can be set by using the numeral keys and zoom key), a magnification of 25% is set; when a magnification of more than 400% is set, a magnification of 400% is set.

| Long. 125% Lat. 90% | → | Long. 124% Lat. 90% |
| Lat. Mag. Set 90% | | Lat. Mag. Set 89% |
| ↑ flash | | ↑ flash |

As the zoom key is continuously pressed, the buzzer is energized at the first time and the first zoom-down is effected at 500 msec, and the buzzer is deenergized at the second time and onward and the zoom-down is effected at 200 msec.

Figure 17A:
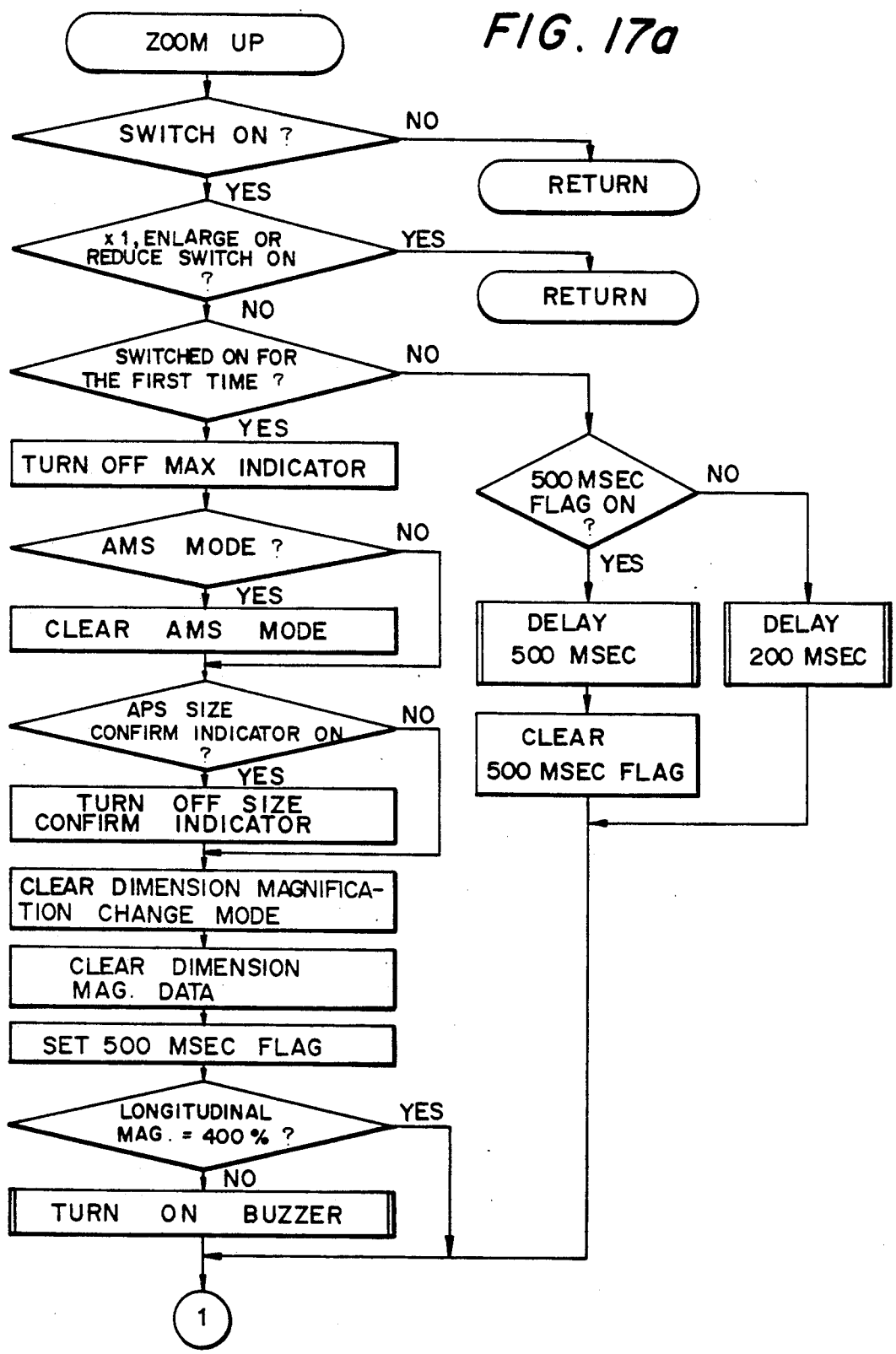
FIGS. 17a and 17b are flowcharts demonstrating a zoom up mode.
Figure 17B:
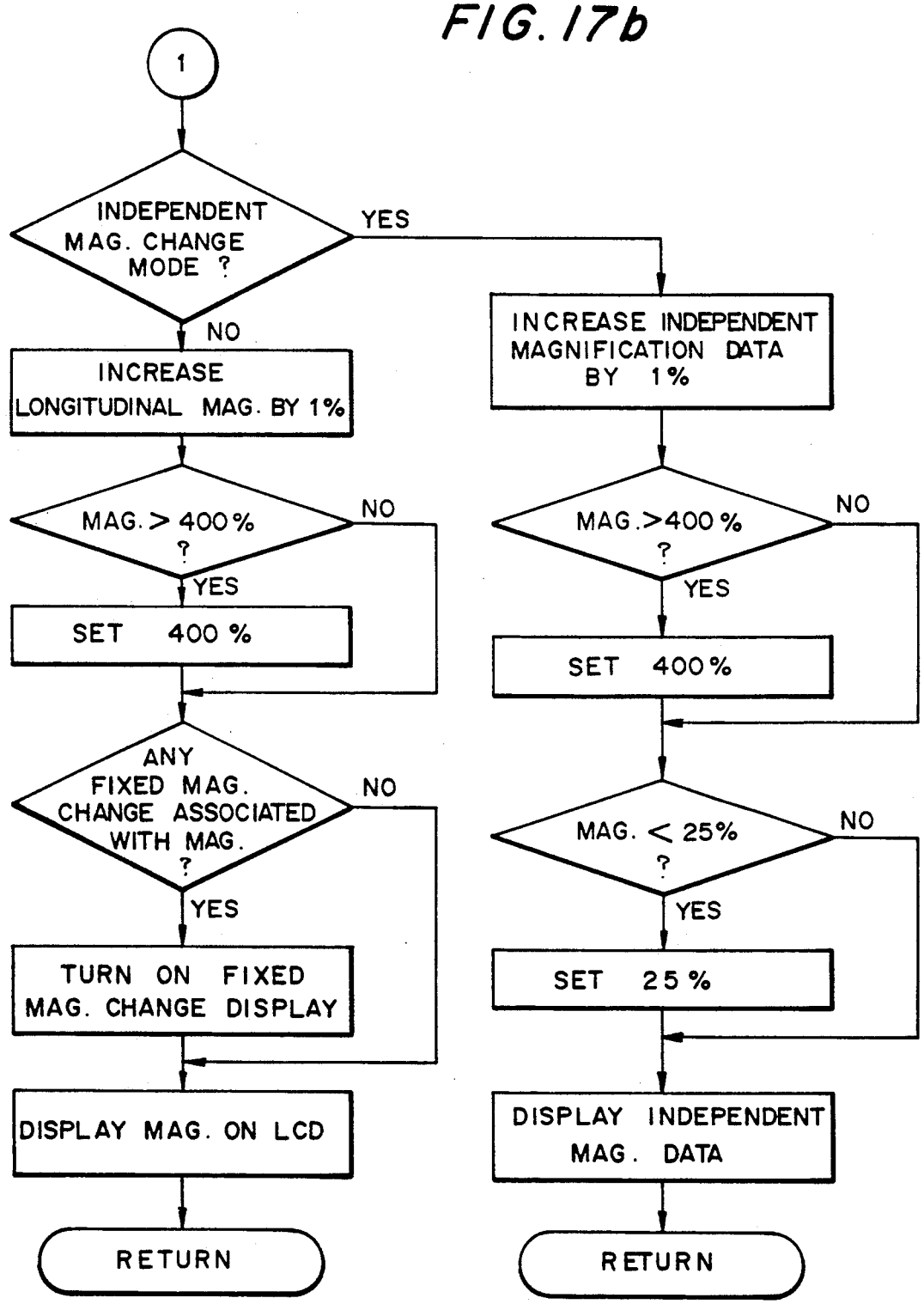

FIGS. 17(a) and (17(b) are flowcharts showing a zoom up (+) mode. This mode is basically the same as the zoom down mode of FIG. 16 and, therefore, details thereof will not be described to avoid redundancy.

Figure 18:
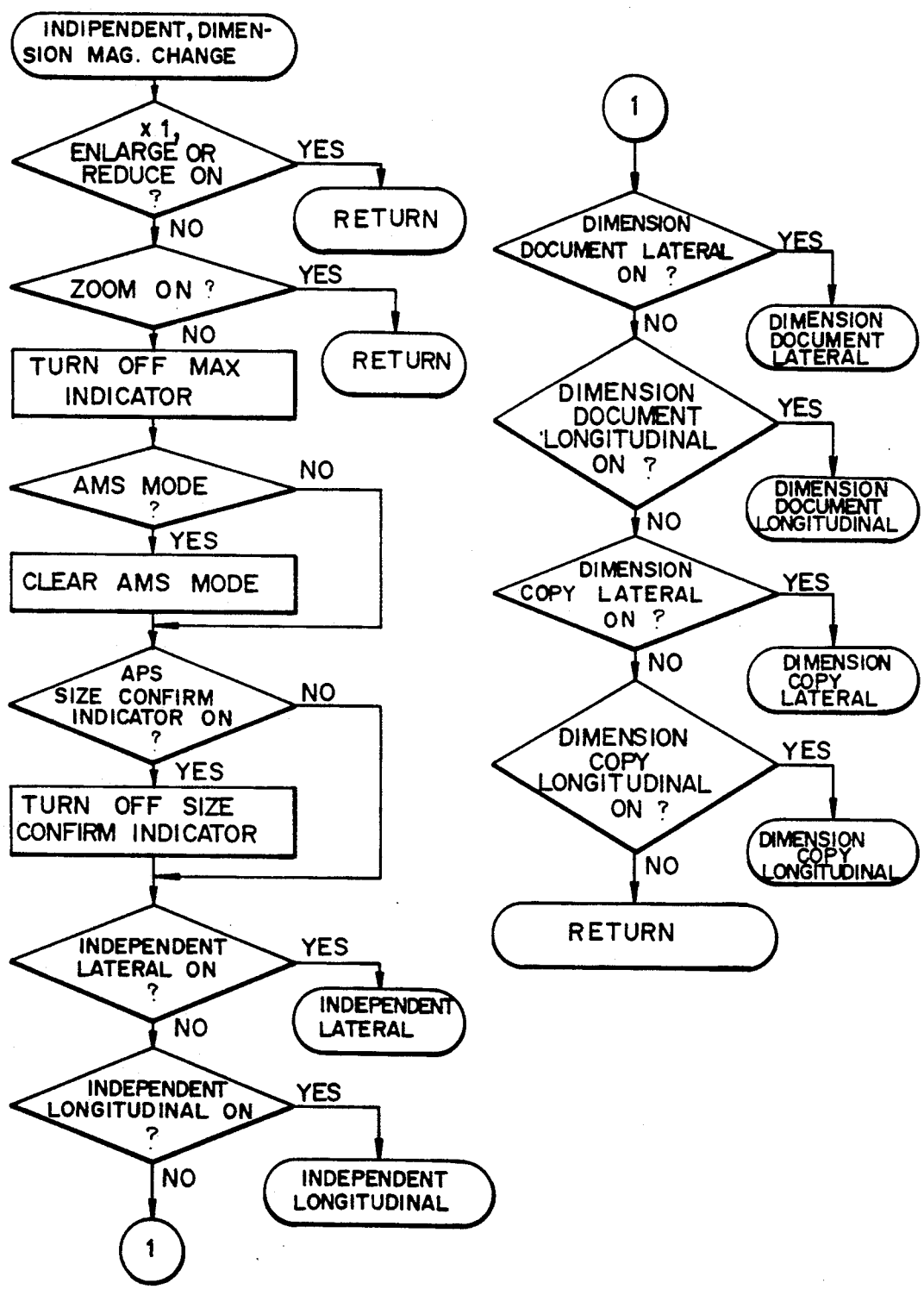
FIG. 18 is a flowchart showing an independent dimension magnification change mode.

FIG. 18 shows an independent or a dimension magnification change mode. As shown, even when any of the independent and dimension magnification change switches is pressed, the input is not accepted if any of the x1, enlarge, reduce and zoom switches has been depressed.

Figure 19:
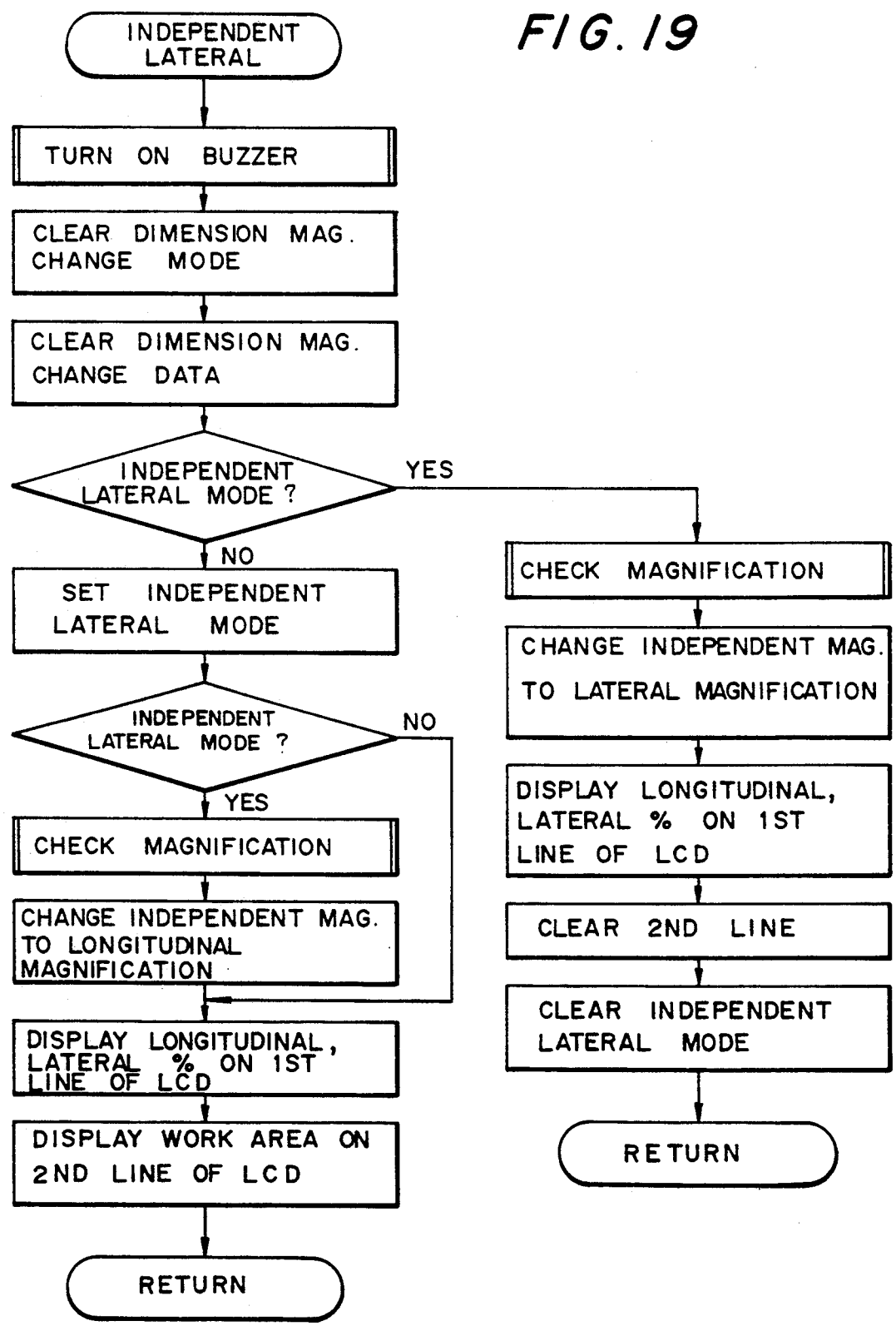
FIG. 19 is a flowchart showing an independent longitudinal mode.

FIG. 19 shows an independent lateral mode. Specifically, when the independent lateral switch is pressed, the dimension magnification change mode as well as data associated therewith is cleared. If the independent lateral mode has already been set up, the magnification is checked. If the independent magnification change data is greater than 400%, 400% is set while, at the same time, the MAX indicator is turned on. If it is smaller than 25%, 25% is set, the MIN indicator is turned on, the independent magnification is set as the lateral magnification, and the longitudinal and lateral magnifications are displayed on the first line of the LCD.

| Long. 100% Lat. 100% | → | Long. 100% Lat. 86% |
|---|---|---|
| Lat. Mag. Set 68% | | |
| | | ↑ flash |

If the current mode is not the independent lateral magnification change mode, the mode is set. If the independent longitudinal magnification change mode has been set up, the independent magnification is set as the longitudinal magnification and then the independent lateral magnification mode is set up.

| (1) | 100% | → | Long. 100% lat. 100% |
|---|---|---|---|
| | | | ↑ flash |
| (2) | Long. 150% Lat. 210% | → | Long. 150% Lat. 210% |
| | | | Lat. Mag. Set 210% |
| (3) | Long. 150% Lat. 210% | → | Long. 167% Lat. 210% |
| | Long. Mag. Set 167% | | Lat. Mag. Set 210% |

The condition (1) shown above exemplifies a case wherein the usual magnification change mode is replaced with the independent lateral magnification change mode. The condition (2) exemplifies a case wherein the independent magnification change mode is replaced with the independent lateral magnification change mode. Further, the condition (3) exemplifies a case wherein the independent longitudinal magnification change mode is replaced with the independent lateral magnification change mode.

As stated above, in the independent magnification change mode, a work area is provided for setting magnification other than the current longitudinal and lateral magnifications, and the indicator associated with the desired magnification is caused to flash. This allows a person to compare the desired magnification and the current magnification and, in addition, facilitates the recognition by the flashing of the magnification data. Further, since the magnification data may be entered by using the zoom key in place of the numeral keys, fine adjustment and easy operation are achieved.

The independent magnification data in the work area will be set as the longitudinal magnification or the magnification at any of the following exemplary timings:

(1) when the same key is pressed, i.e., when data is set in the independent lateral magnification change mode and then the independent lateral magnification key is pressed again;

(2) when any other independent magnification change key is pressed, i.e., when data is set in the independent longitudinal magnification change mode and then the independent lateral magnification change key is pressed to set the longitudinal data;

(3) when the enter key (# key) is pressed; and (4) when the print switch is depressed.

Figure 20:
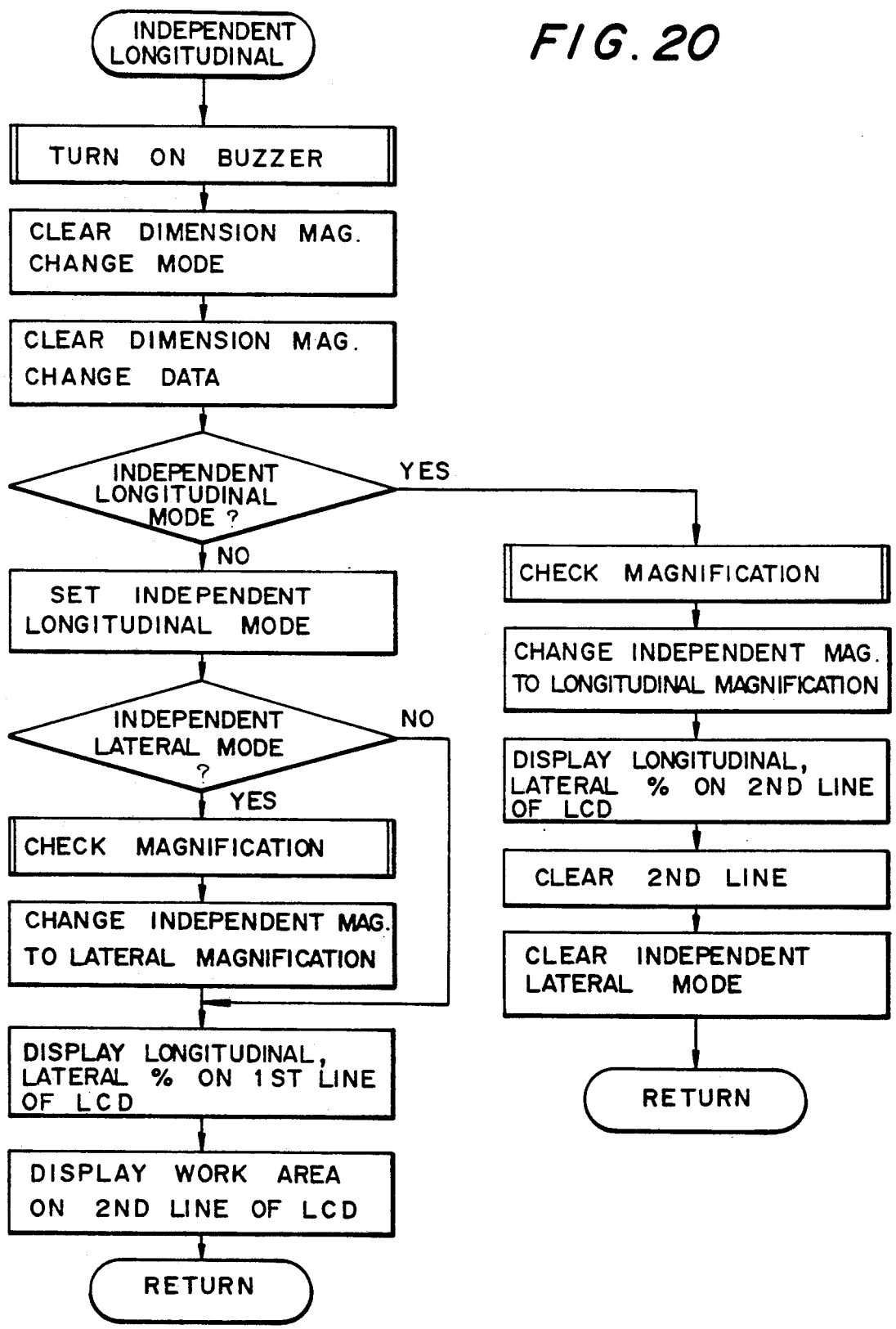
FIG. 20 is a flowchart showing an independent lateral mode.

FIG. 20 shows an independent longitudinal mode which is essentially the same as the independent lateral mode of FIG. 19 and, hence, details thereof will not be described.

Figure 21:
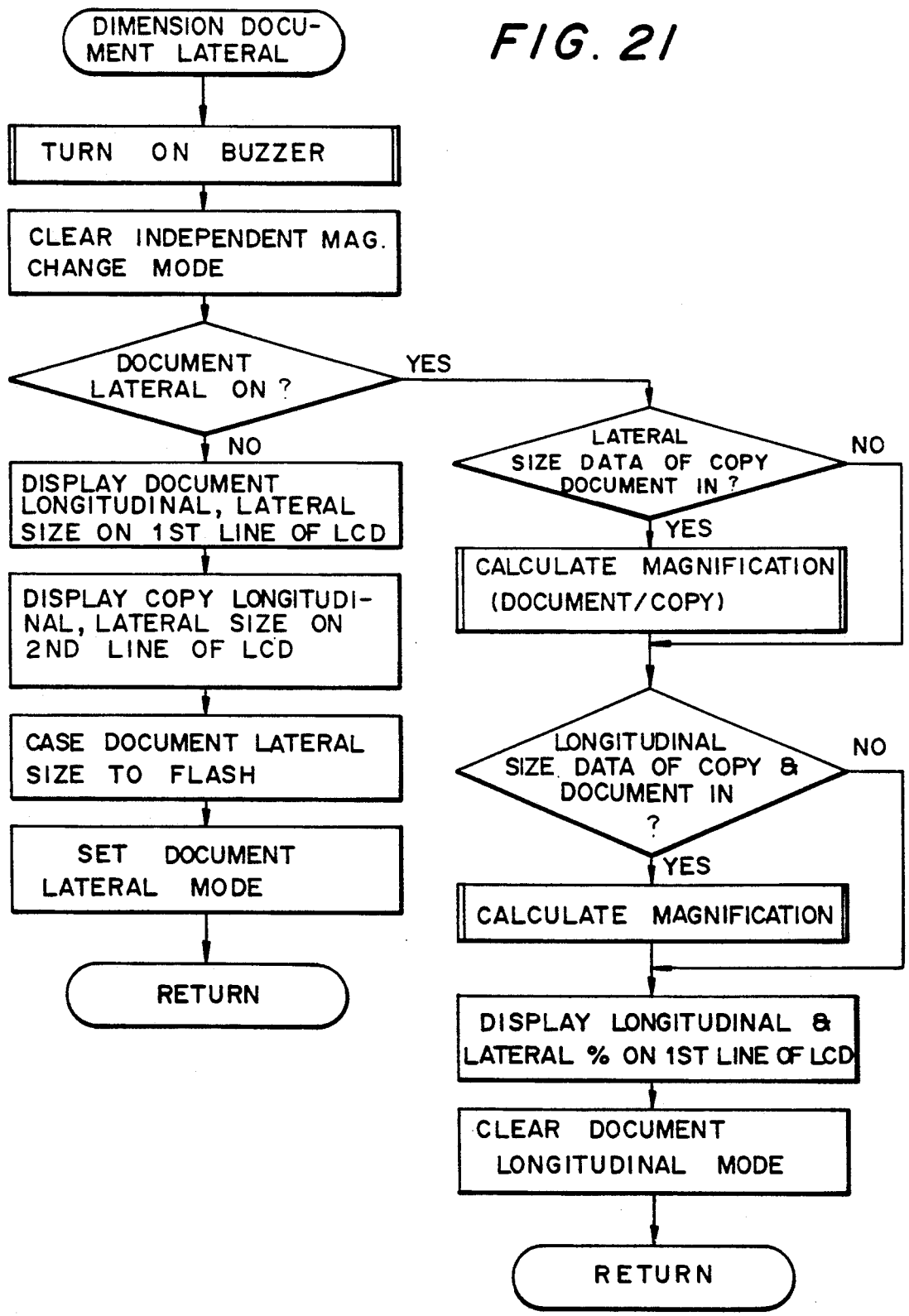
FIG. 21 is a flowchart showing a dimension document lateral mode.
Figure 22:
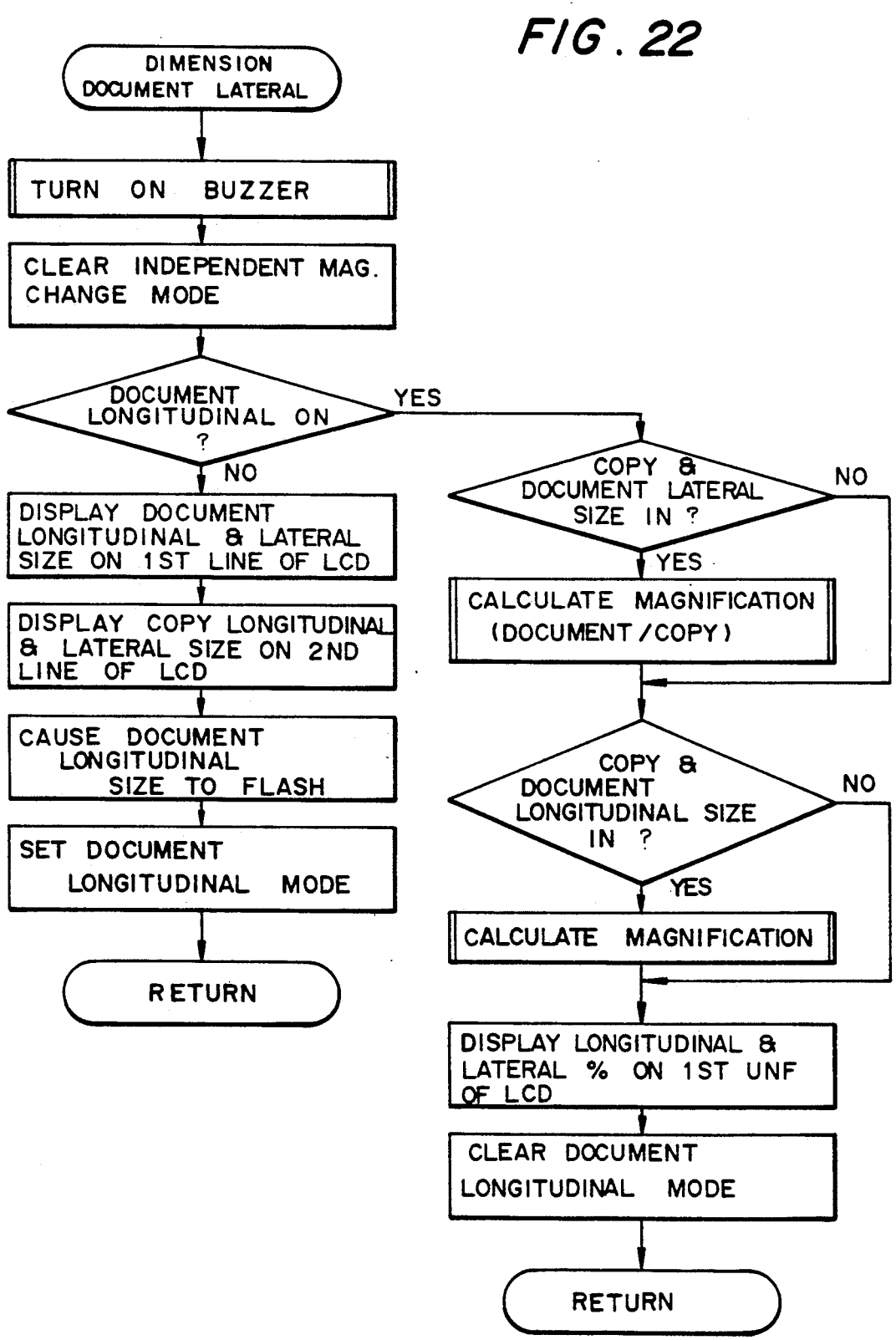
FIG. 22 is a flowchart showing a dimension document longitudinal mode.
Figure 23:
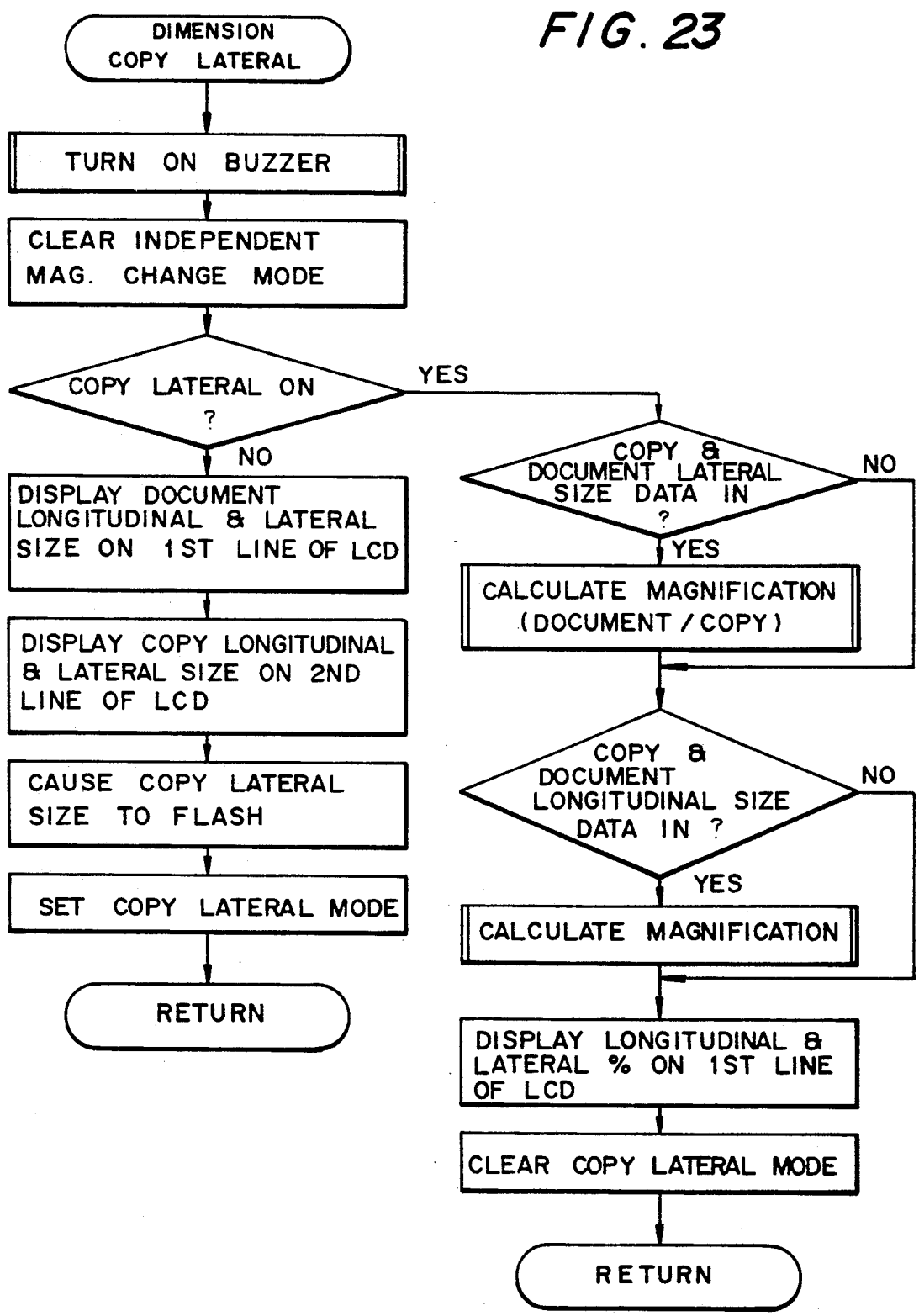
FIG. 23 is a flowchart showing a dimension copy longitudinal mode.
Figure 24:
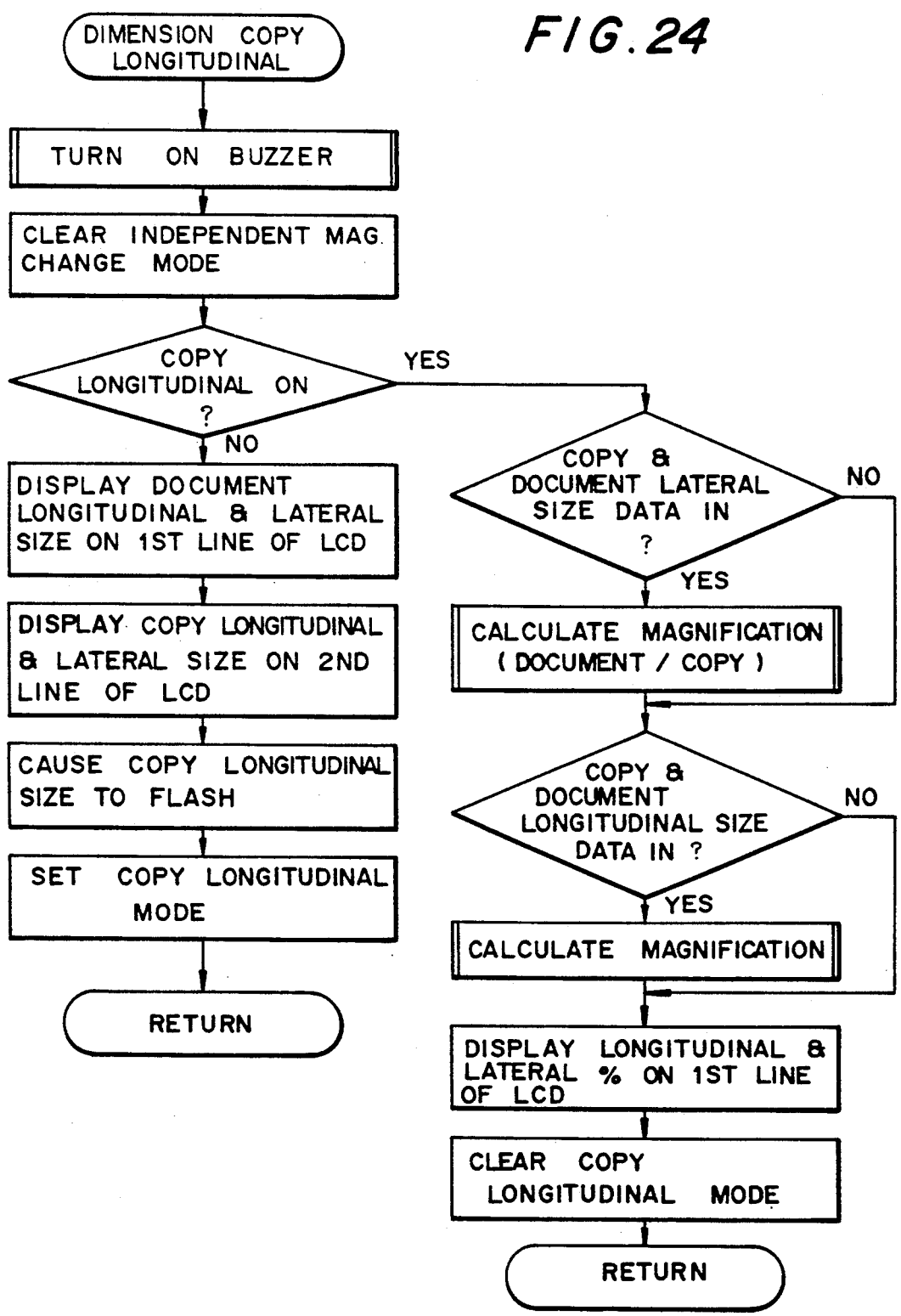
FIG. 24 is a flowchart showing a dimension copy longitudinal mode.
Figure 25:
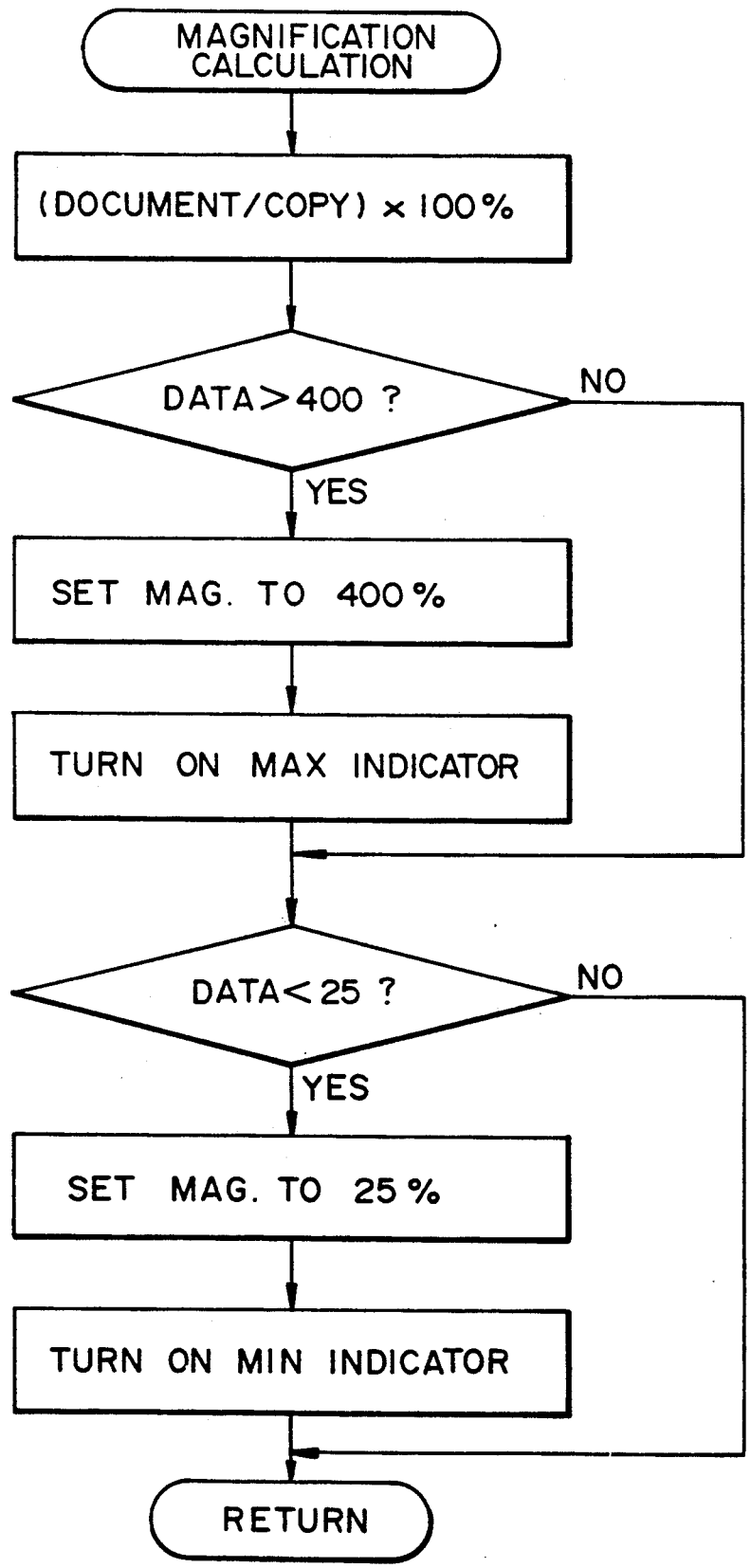
FIG. 25 is a flowchart showing a magnification calculate mode.

FIGS. 21 to 25 are flowcharts each showing a dimension magnification change mode. Specifically, FIG. 21 shows a dimension document lateral mode. In this mode, when the dimension document lateral switch is pressed, the independent magnification change mode is cleared. If the document lateral input mode has been set up, whether the lateral dimension of a copy and that of a document have been entered is checked. If they have been entered, a longitudinal magnification is calculated and set. Thereafter, the longitudinal and lateral magnifications are displayed on the first line of the LCD. If the longitudinal and lateral dimensions have not been entered, a magnification before the dimension magnification change is displayed because any magnification cannot be calculated.

(1) Exemplary case wherein the longitudinal and lateral dimensions are entered

| document | long. 98 mm | lat. 100 mm |
|---|---|---|
| copy | long. 50 mm | lat. 120 mm |
| then, | | |
| | long. mag. 51% | lat mag. 120% |

(2) Exemplary case wherein only the lateral dimensions of a copy and a document are entered (assuming that the previous magnification is 100%)

| document | long. 98 mm | lat. 100 mm |
|---|---|---|
| copy | long. | lat. 120 mm |
| then, | | |
| | long. mag. 100% | lat. mag. 120% |

When the dimension document lateral input mode is not set up, the mode is set; when any size data is preserved, the size data is displayed; and when no such data is preserved, dots ". . . . . ." are displayed and caused to flash.

(1) Exemplary case wherein no size data is entered

| document | long. mm | lat. . . . . . . mm |
|---|---|---|
| copy | long. mm | lat. mm |

Here, the dots ". . . . . ." indicative of a document lateral size flash.

(2) Exemplary case wherein previously entered size data are preserved

| document | long. 98 mm | lat. 100 mm |

| -continued | | |
|---|---|---|
| copy | long. 50 mm | lat. 120 mm |

Here, "100" indicative of the document lateral dimension flashes.

As described above, when any one of the document longitudinal and lateral and the copy longitudinal and lateral keys is pressed, all the data are displayed and recognizable with ease. Further, if data has already been entered, dots ". . . . . ." flash to show a person paraticular data being entered. These dimension size data will be erased only when a magnification change key other than the dimension magnification change keys is depressed and in the event of automatic resetting. For example, after a person has entered the dimensions and then operated the copier to produce a copy, he or she can readily change the dimensions by looking at the size data being preserved.

The longitudinal and lateral magnifications will be calculated at any of the following timings:

(1) when the same key is pressed again;
(2) when the enter key (# key) is pressed; and
(3) when the print switch is pressed.

Hereinafter will be described how the laser diode power which is applied to the apparatus of the present invention is set. A laser diode driver is implemented by a single board. This board is adjusted by applying a level (voltage) to the driver and such that APC data is controlled to a predetermined voltage (here 3 volts) when desired laser diode power is achieved. A variable resistor VR is used to cause a voltage which generates predetermined laser diode power (i.e. 3 volts) to appear on the CPU analog port (AN1). In this condition, the level (voltage) is applied from the CPU to the laser diode via the AD converter. If the output APC data coincides with the voltage which is developed by the VR, the predetermined laser diode power is attained.

Figure 27:
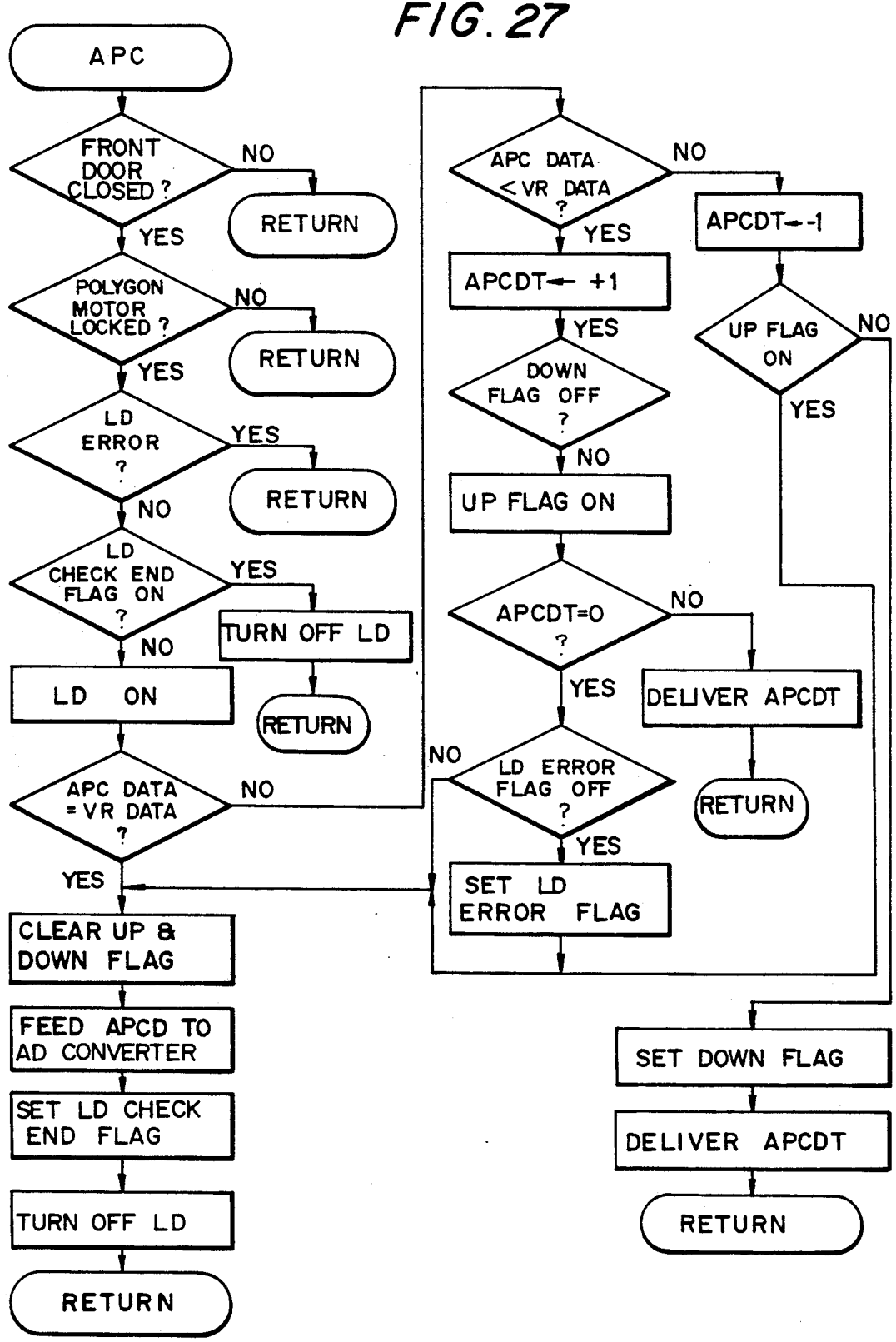
FIG. 27 is a flowchart representative of laser diode control.

Referring to FIG. 27, there is shown a flowchart representative of laser diode control. While the front door is open, the laser diode is not powered and therefore the laser diode control is not effected. Also, while the polygon motor is not locked, the control is not executed because turning on the laser diode in such a condition would illuminate only one point of the drum to aggravate its fatigue. When a laser diode check end flag is set, it is decided that the laser diode power setting has been completed and, hence, the laser diode is turned off. When that flag is cleared, the control begins.

Figure 26:
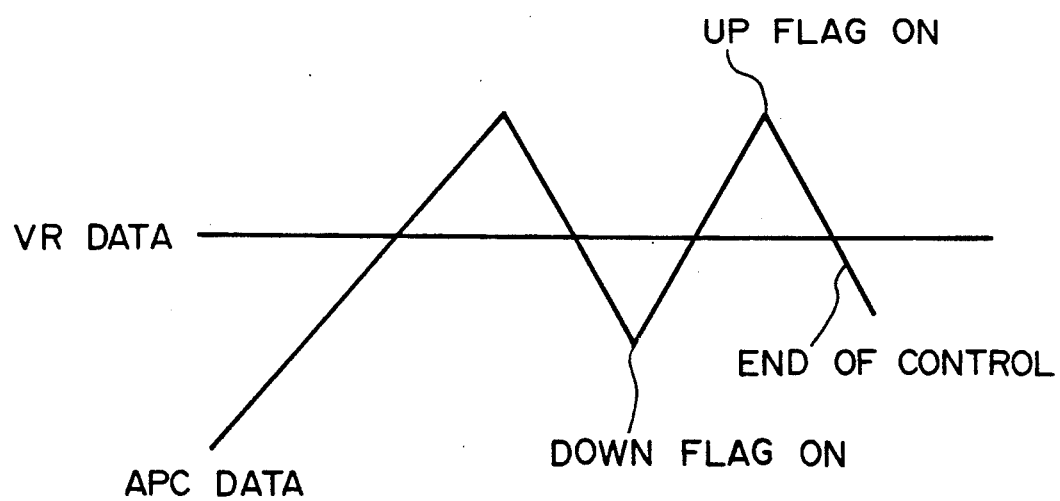
FIG. 26 is a diagram useful for explaining a laser diode control method.

When the APC data is the same as the VR data, it is decided that the control has been ended, the laser diode check end flag is set, and the laser diode is turned off. If the P data and the VR data are not the same, it is decided that the control has been completed only if the APC data fluctuates to opposite sides of the VR data, as shown in FIG. 26.

The control over the fixing heater at the buildup stage is extremely susceptible to the ambient temperature of the laser diode. Hence, at the instant when the fixing temperature has built up, the laser diode check flag is cleared to adjust the laser diode power.

Figure 29:
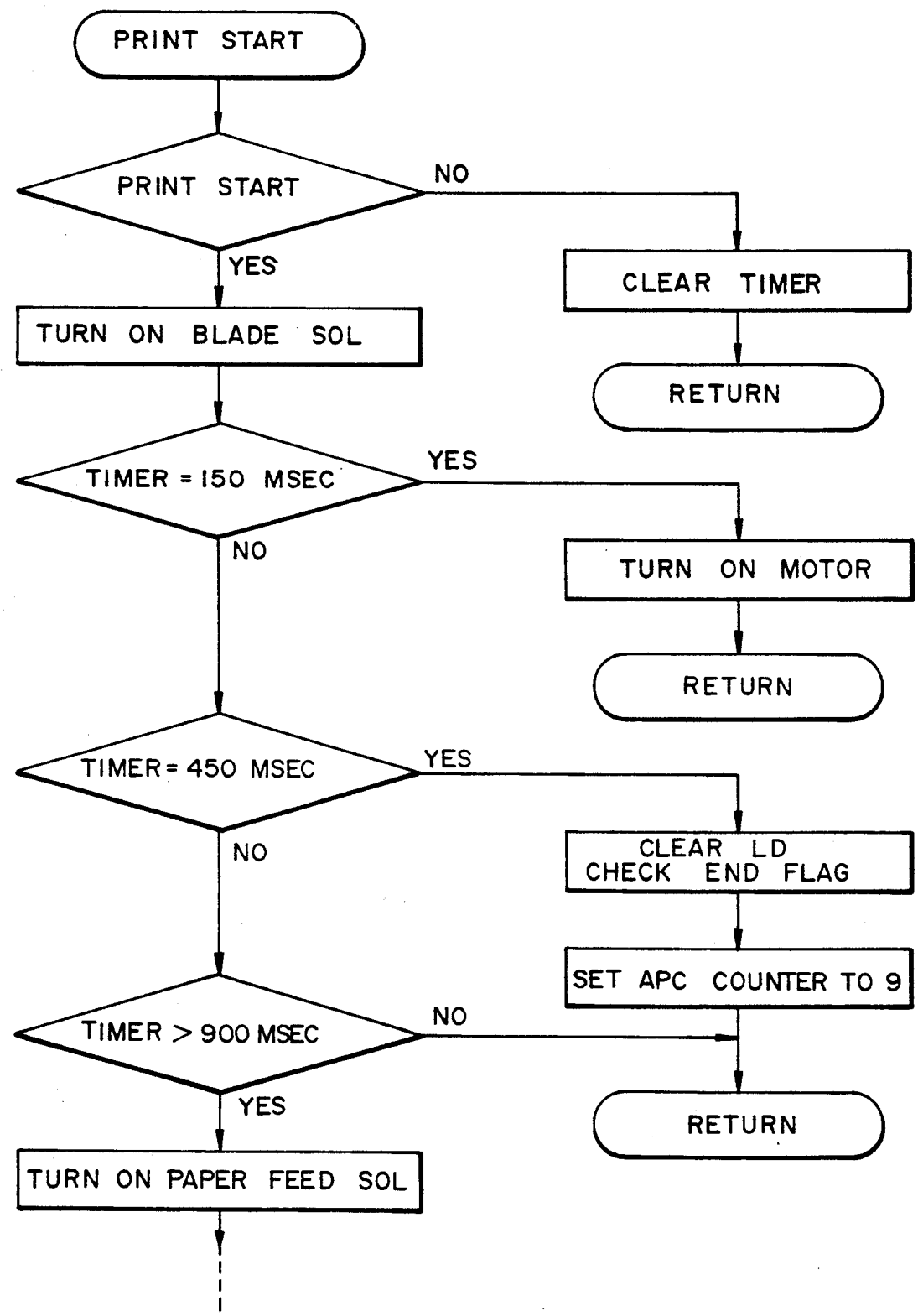
FIG. 29 is a flowchart representative of control which is effected at the leading end of the first copy.

FIG. 29 demonstrates a procedure for adjusting the leading end of the first copy. After the turn-on of the print switch and before image data for the first copy are produced (in this embodiment, they are produced before the first paper is fed), the laser diode check end flag is cleared to adjust the laser diode power. This is because should the ambient temperature and/or the laser diode power change with the copier left unoperated for a substantial period of time, a desired copy would be unachievable unless the adjustment was performed at the leading end of the first paper.

Figure 30:
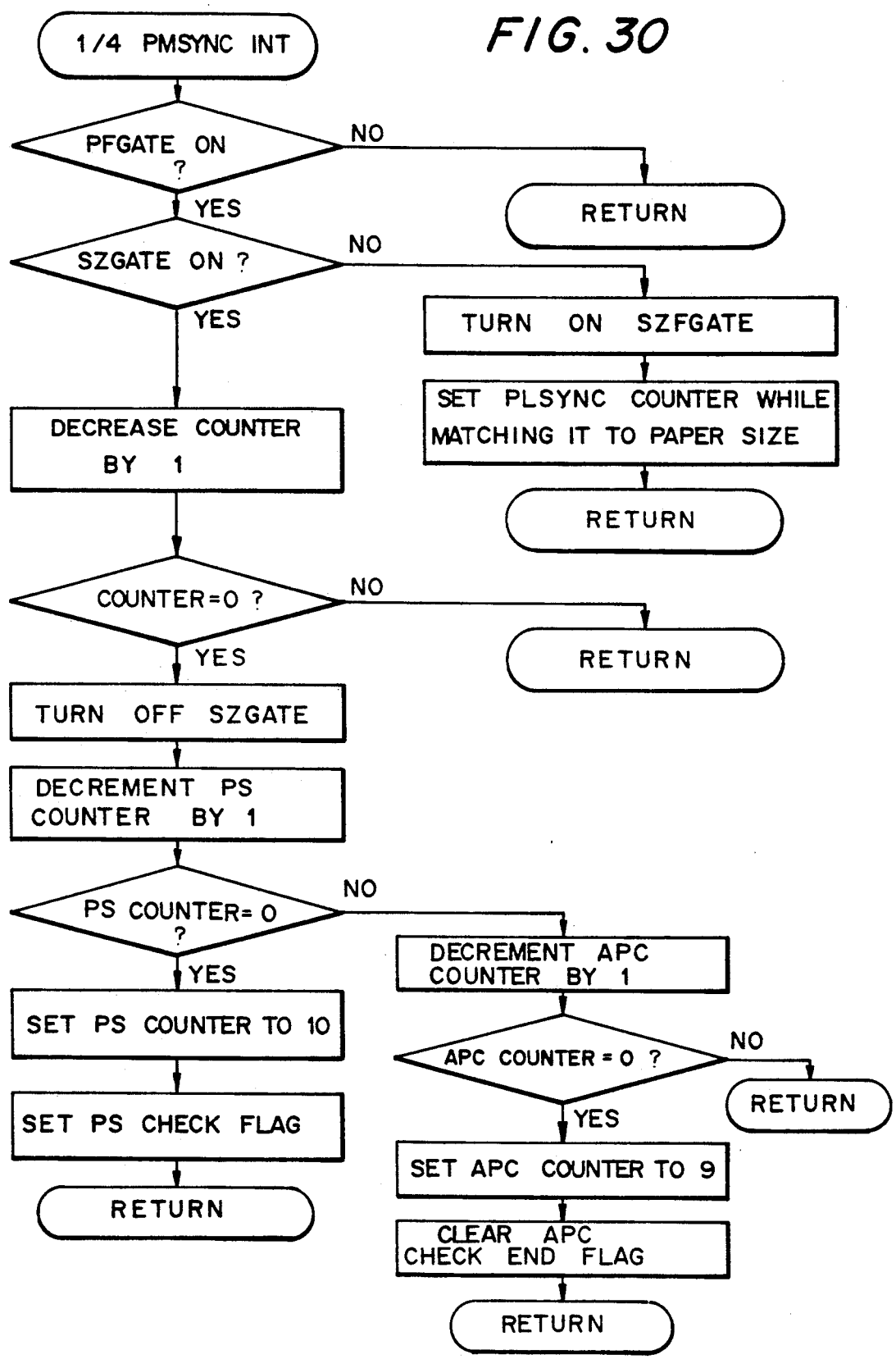
FIG. 30 is a flowchart representative of adjustment which occurs during continuous copying operation.

FIG. 30 is a flowchart associated with the adjustment which occurs during copying operation. Specifically, the procedure of FIG. 30 is adapted to check the laser diode power at the trailing end of an image while a continuous copying operation is under way.

In this embodiment, at the trailing end of an image, P.S. control is effected 1/10 time while, at the same time, the laser diode power is set 1/10 time. This is to cope with the temperature in the machine which is elevated by continuous copying. For example, when one copy is to be produced from one document, the P.S. control is effected at the leading end of the first copy; when nine copies are produced from one document, it is effected at the leading end of the first copy; when ten copies are produced from one document, it is effected at the leading end of the first copy and at the trailing end of the tenth copy; when fifty-five copies are to be produced from one document, it is effected at the leading end of the first copy and the trailing end of the tenth copy, twentieth copy, thirtieth copy, fortieth copy and fiftieth copy.

Such laser diode power adjustment is implemented with a DA converter and performed such that a laser diode power level is inputted in voltage level and controlled to a predetermined reference voltage. The laser diode power level is set upon the lapse of a predetermined period of time after the polygon motor has been locked, after the fiing heater has built up, at the leading end of the first copy, or while a repeat copy mode operation is under way. The laser diode may be on-off controlled by using a timer for the generation of a synchronizing signal of a digital copier. In such a case, the laser diode is turned off at a position which does not coincide with the drum and turned on when the synchronizing signal is turned off. At the initial stage, the laser diode is turned on for a certain period of time to generate the synchronizing signal.

Figure 28A:
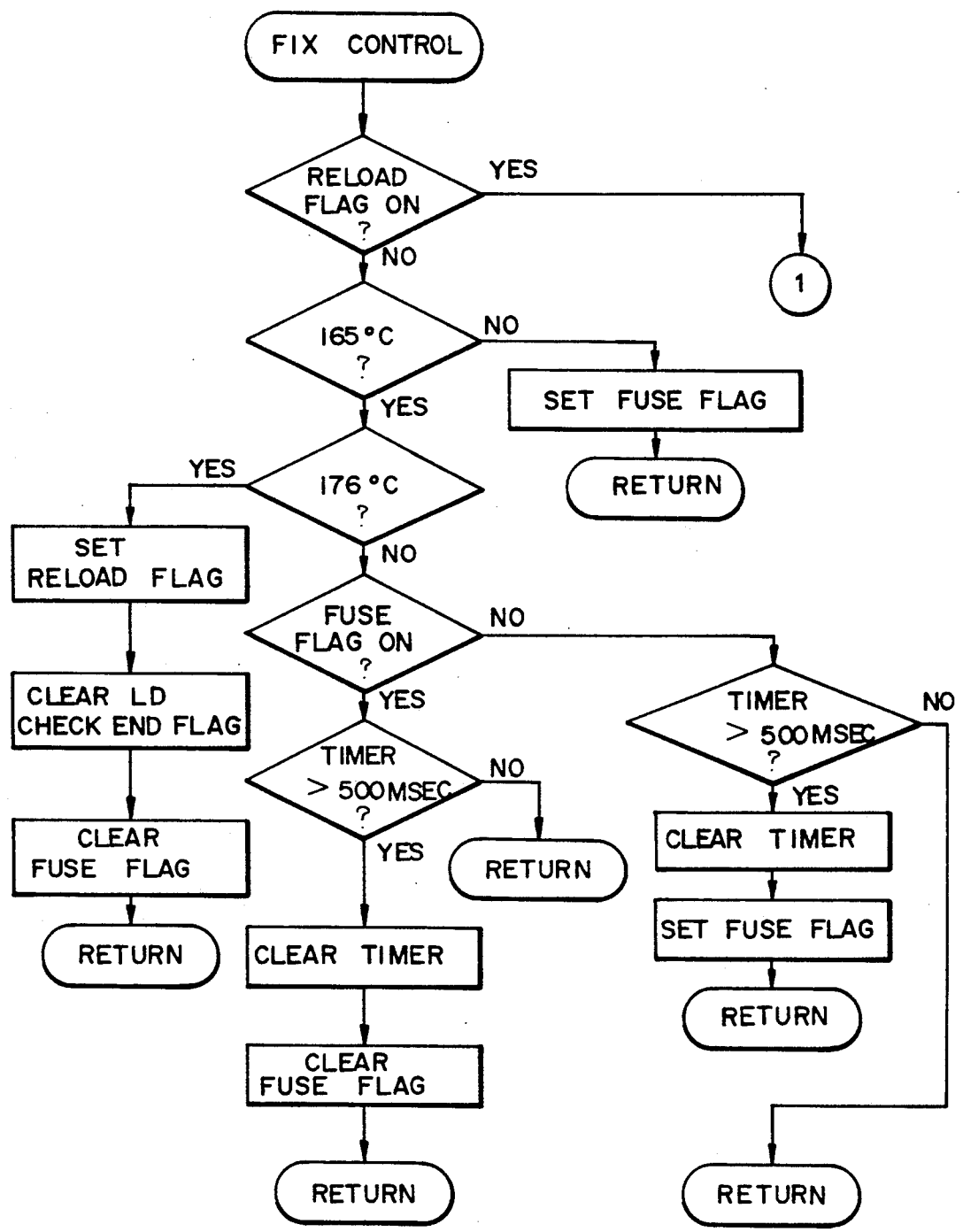
FIGS. 28a and 28b are flowcharts showing fixing control.
Figure 28B:
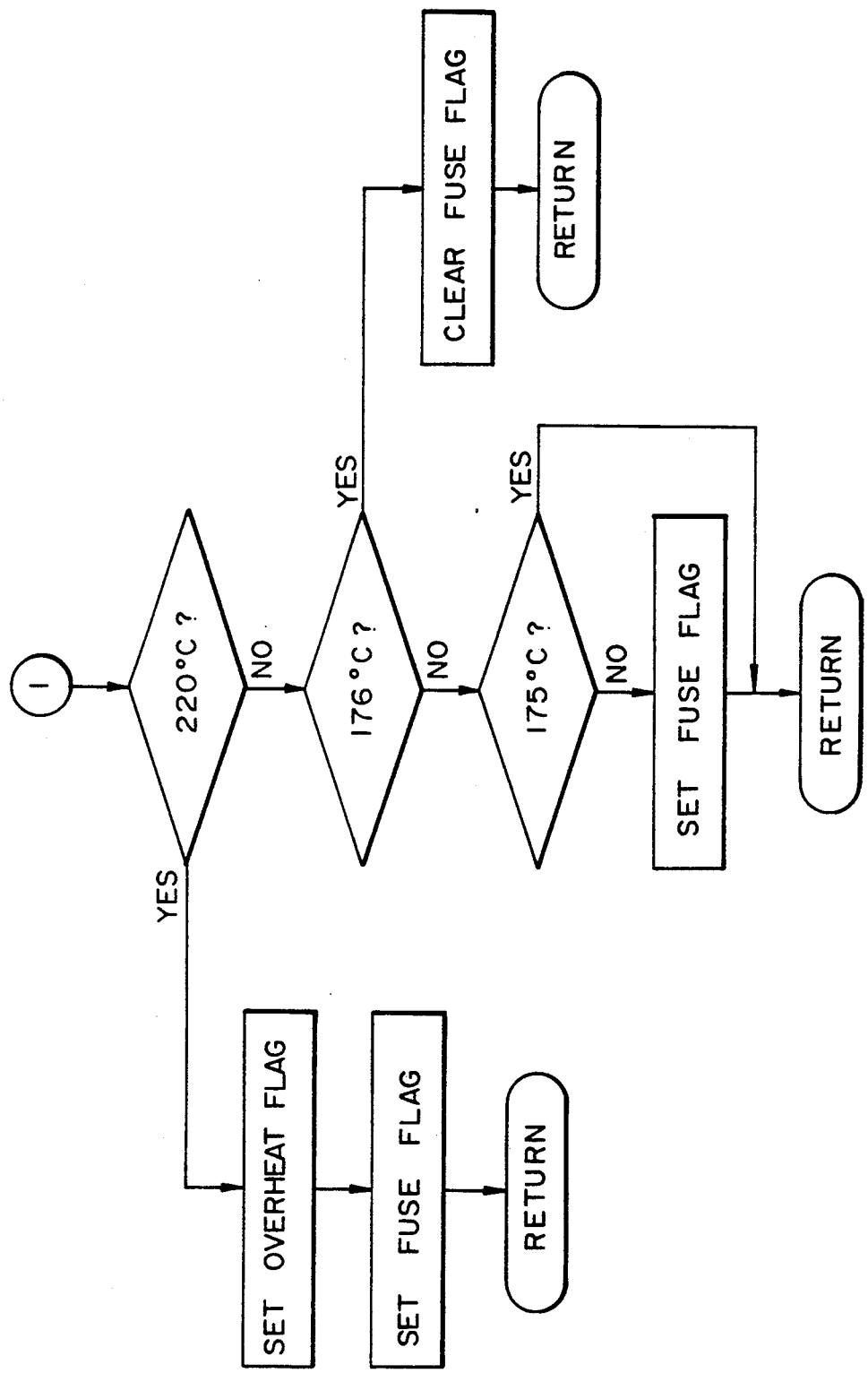
Figure 31:
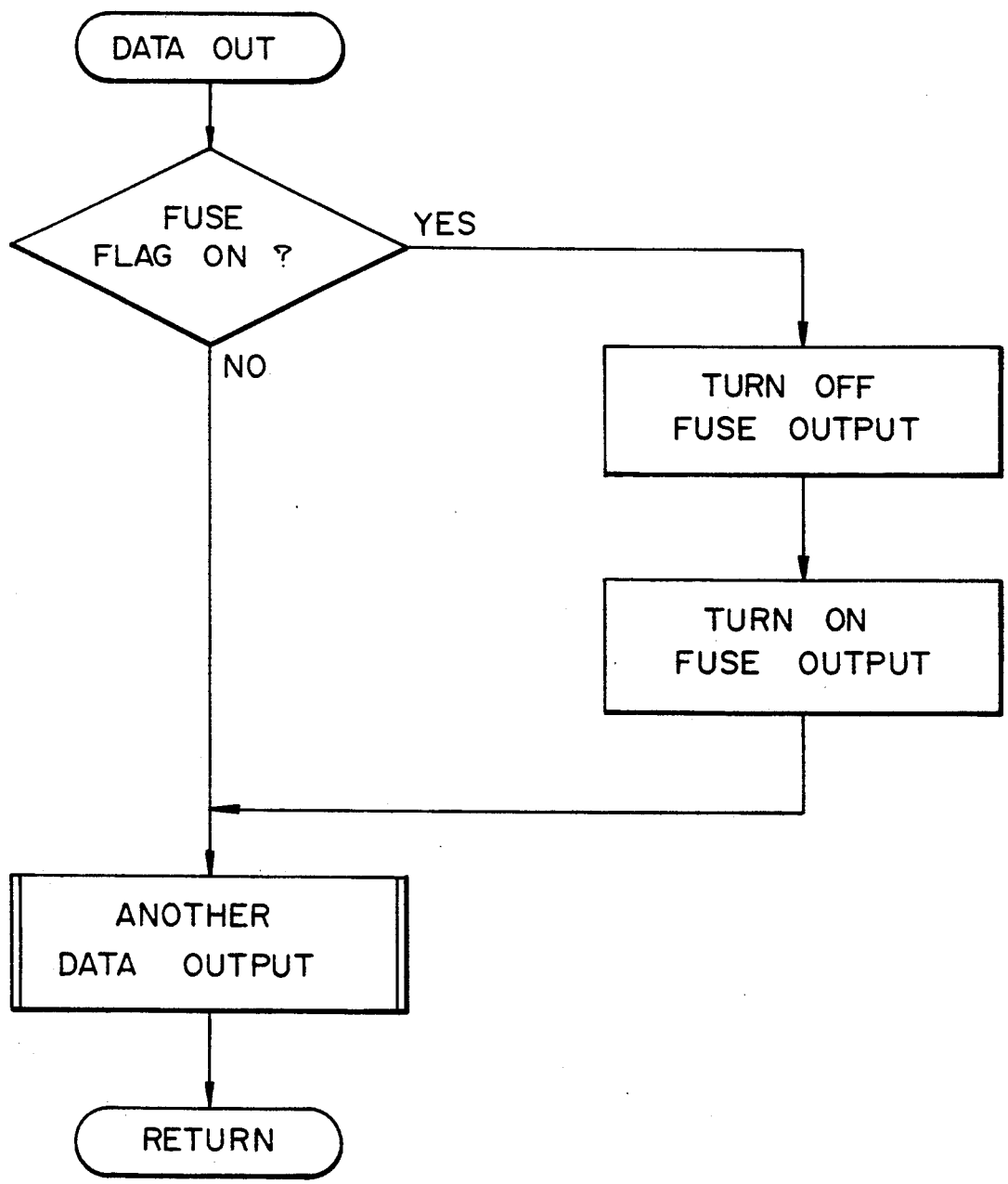
FIG. 31 is a flowchart representative of a condition in which an output is applied to a port in a data-routine.
Figure 32:
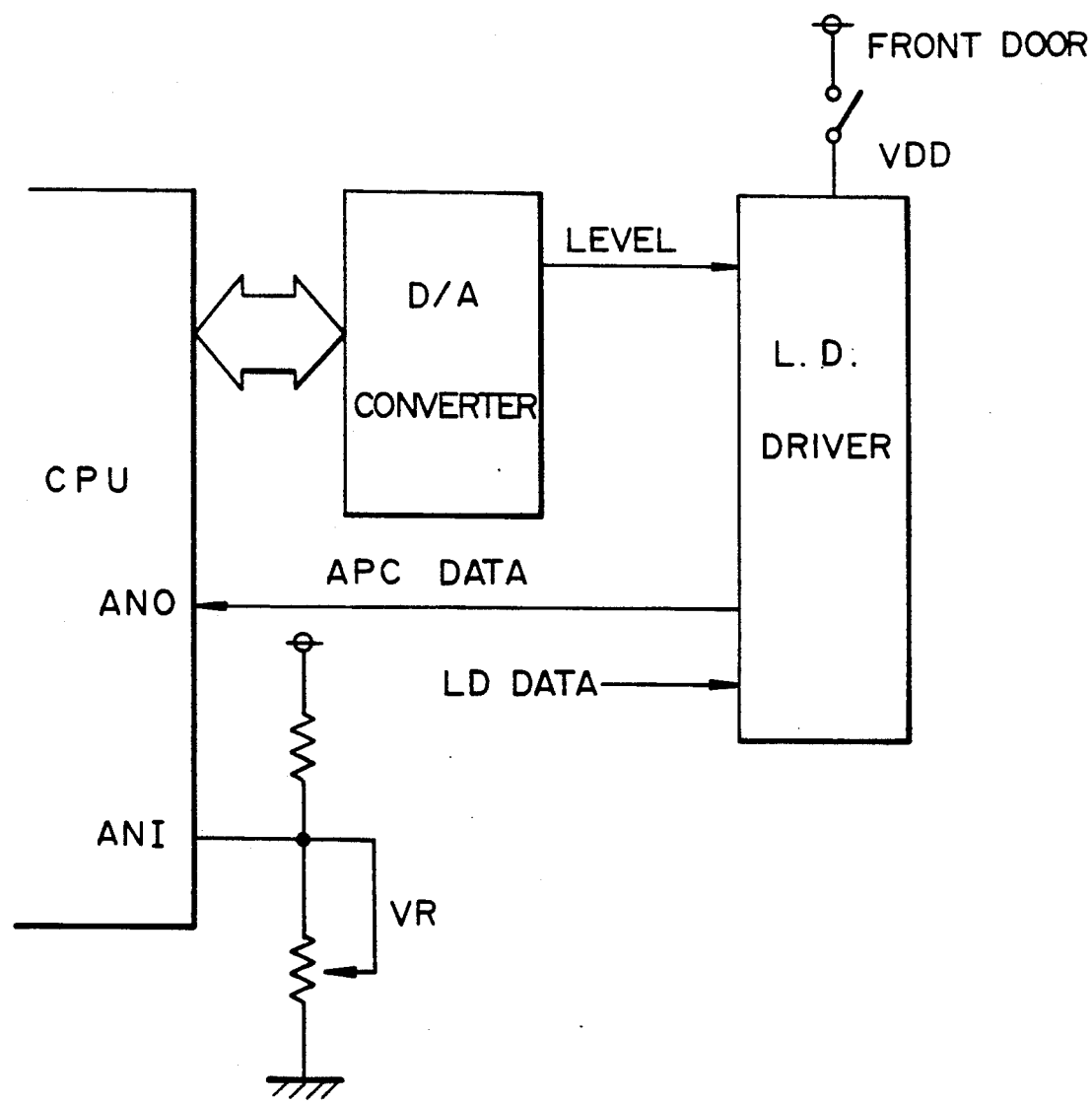
FIG. 32 is a flowchart associated with a laser diode controller.
Figure 33:
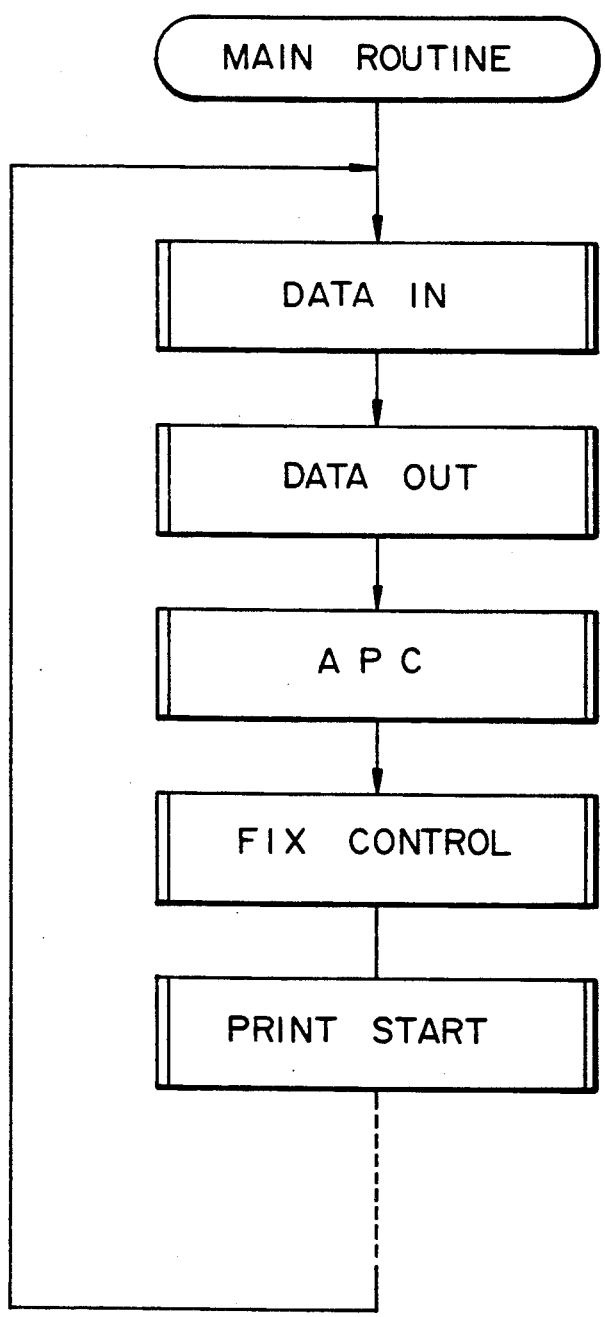
FIG. 33 is a flowchart representative of fixing control.
Figure 35:
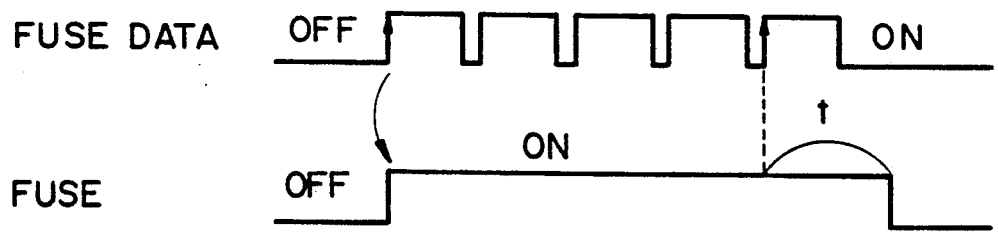
FIG. 35 is a timing chart demonstrating fixing control.

As for fixing temperature control, it is executed by the CPU. In the prior art system in which a CPU delivers an on-off signal, should the signal has an on state in the event of overrun of the CPU, the fixing station would be overheated to catch fire. In the illustrative embodiment, the on signal from the CPU is a pulse and, by using a retriggerable monostable multivibrator, a fixing operation is executed for a predetermined period of time by a pulse signal from the CPU. For example, as shown in FIGS. 28a and 28b, a fuse is held in an on state up to 165° C. until a reload condition is reached and, from 165° C. to 178° C., it is turned on and off with a duty of one half of 500 msec. This is to prevent the fixing operation from overshooting when the fuse is turned off at 176° C. At 176° C., a reload flag is set so that the usual on-off control for the temperatures of 176° C. to 175° C. is effected. Here, a fix flag is turned on and off so that data is outputted to a port by a data out routine (see FIG. 31). While the flag is set, a signal whose state changes from off to on is repetitively delivered (see FIG. 35).

Figure 34:
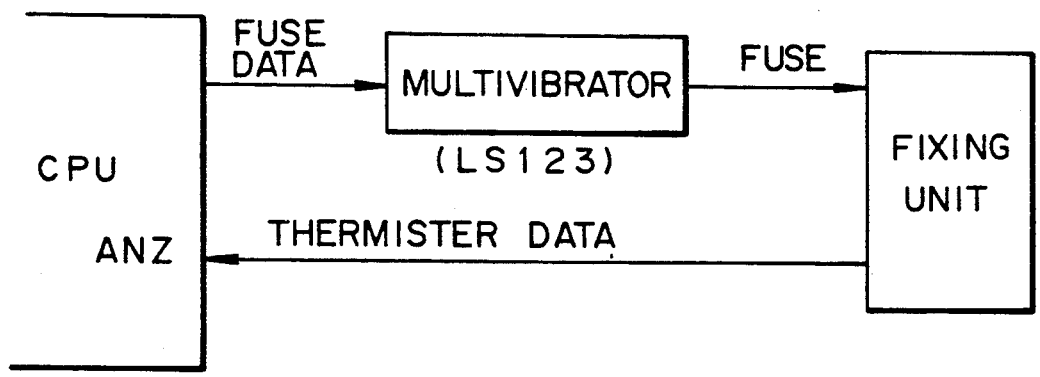
FIG. 34 is a schematic block diagram representative of fixing control.

As shown in FIG. 34, the signal mentioned above is applied to a multivibrator which then produces a fix on signal for a period of time which is predetermined by CR. When the CPU overruns due to noise, instantaneous shut-off and other causes, no pulse is applied to the multivibrator to prevent the heating section from being overheated.

In summary, it will be seen that the present invention allows the background and the image area of a digital image to be varied in level independently of each other. Hence, even when the background is erased by automatic density adjustment, the level of the image area can be adjusted as desired. In addition, an optimum image is achievable despite marker editing.

Various modifications will become possible for those skilled in the art after receiving the teachings of the present disclosure without departing from the scope thereof.

What is claimed is:

1. A density control system for a digital copier comprising:
    scanning means for optically scanning an original document;
    photoelectric converting means for photoelectrically converting image data representative of the original document produced by said scanning means;
    detecting means for detecting a peak voltage of the image data produced by said photoelectric converting means;
    analog-to-digital (AD) converting means for digitizing the image data produced by said photoelectric converting means the image data produced by said photoelectric converting means and erasing the background density of the image data representative of a document, by using the peak voltage detected by said detecting means;
    storing means for storing a plurality of density data each having a particular threshold level;
    manual density adjusting means for selecting one of the plurality of density data stored in said storing means; and
    control means for controlling image density by comparing the digitized image data produced by said AD converting means and the selected density data.

2. A density control system according to claim 1, further comprising:
    automatic density adjusting means for producing predetermined density data; and
    switching means for selecting density data from one of the automatic density adjusting means and the manual density adjusting means;
    wherein said control means compares digitized image data produced by said AD converting means and density data selected by said switching means.

3. A density control system according to claim 2, wherein said switching means initially selects density data identical with the predetermined density data from the automatic density adjusting means and selects the darkness with respect thereto.

* * * * *